(12) United States Patent
Morishige et al.

(10) Patent No.: US 11,661,636 B2
(45) Date of Patent: *May 30, 2023

(54) METHOD FOR MANUFACTURING GRAIN-ORIENTED ELECTRICAL STEEL SHEET AND GRAIN-ORIENTED ELECTRICAL STEEL SHEET

(71) Applicant: NIPPON STEEL CORPORATION, Tokyo (JP)

(72) Inventors: Nobusato Morishige, Tokyo (JP); Takashi Kataoka, Tokyo (JP); Haruhiko Atsumi, Tokyo (JP); Yasuhiro Mayumi, Tokyo (JP); Toshiya Takechi, Tokyo (JP); Naoto Masumitsu, Tokyo (JP); Tomoya Suenaga, Tokyo (JP); Masamitsu Kubota, Tokyo (JP); Hideyuki Hamamura, Tokyo (JP); Kazuhiko Fukutani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 16/981,126

(22) PCT Filed: Mar. 19, 2019

(86) PCT No.: PCT/JP2019/011489
§ 371 (c)(1),
(2) Date: Sep. 15, 2020

(87) PCT Pub. No.: WO2019/181952
PCT Pub. Date: Sep. 26, 2019

(65) Prior Publication Data
US 2021/0017619 A1    Jan. 21, 2021

(30) Foreign Application Priority Data
Mar. 20, 2018    (JP) .............................. JP2018-052899

(51) Int. Cl.
*C21D 9/46* (2006.01)
*C21D 8/12* (2006.01)
*C22C 38/00* (2006.01)
*C22C 38/02* (2006.01)
*C22C 38/04* (2006.01)
*C22C 38/06* (2006.01)
*C22C 38/08* (2006.01)
*C22C 38/20* (2006.01)
*C22C 38/60* (2006.01)
*C23G 1/00* (2006.01)
*H01F 1/147* (2006.01)

(52) U.S. Cl.
CPC ............. *C21D 9/46* (2013.01); *C21D 8/1222* (2013.01); *C21D 8/1233* (2013.01); *C21D 8/1272* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/20* (2013.01); *C22C 38/60* (2013.01); *C23G 1/00* (2013.01); *H01F 1/14783* (2013.01)

(58) Field of Classification Search
CPC ................................ H01F 1/055; C21D 9/46
See application file for complete search history.

(56) References Cited

U.S. PATENT DOCUMENTS

| 2015/0243419 A1 | 8/2015 | Senda et al. |
| 2019/0055619 A1 | 2/2019 | Imamura et al. |
| 2021/0047704 A1* | 2/2021 | Morishige ............ C21D 8/1238 |

FOREIGN PATENT DOCUMENTS

| EP | 0 334 223 A2 | 9/1989 |
| EP | 2 584 054 A1 | 4/2013 |
| EP | 3 196 320 A1 | 7/2017 |
| JP | 7-268567 A | 10/1995 |
| JP | 2000-45052 A | 2/2000 |
| JP | 2014-194073 A | 10/2014 |

(Continued)

OTHER PUBLICATIONS

"Methods of measurement of the magnetic properties of magnetic steel sheet and strip by means of a single sheet tester", JIS C 2556, 1996, total 6 pages.
"Test methods for electrical steel strip and sheet—Part 1: Methods of measurement of the magnetic properties of electrical steel strip and sheet by means of an Epstein frame", JIS C 2550-1, 2011, total 22 pages.

* cited by examiner

*Primary Examiner* — Jophy S. Koshy
(74) *Attorney, Agent, or Firm* — Birch, Stewart, Kolasch & Birch, LLP

(57) ABSTRACT

A method for manufacturing a grain-oriented electrical steel sheet according to an aspect of the present invention includes a step of obtaining a hot-rolled steel sheet by carrying out hot rolling on a slab containing a predetermined component composition with a remainder including Fe and impurities, a step of obtaining a hot-rolled annealed sheet by carrying out hot-rolled sheet annealing as necessary, a step of carrying out pickling to obtain a pickled sheet, a step of carrying out cold rolling to obtain a cold-rolled steel sheet, a step of carrying out primary recrystallization annealing, a step of applying an annealing separating agent including MgO to a surface and then carrying out final annealing to obtain a final-annealed sheet, and a step of applying an insulating coating and then carrying out flattening annealing.

2 Claims, 1 Drawing Sheet

(56) References Cited

FOREIGN PATENT DOCUMENTS

| | | |
|---|---|---|
| JP | 2017-222898 A | 12/2017 |
| WO | WO 2013/175733 A1 | 11/2013 |
| WO | WO 2014/049770 A1 | 4/2014 |
| WO | WO 2017/154929 A1 | 9/2017 |

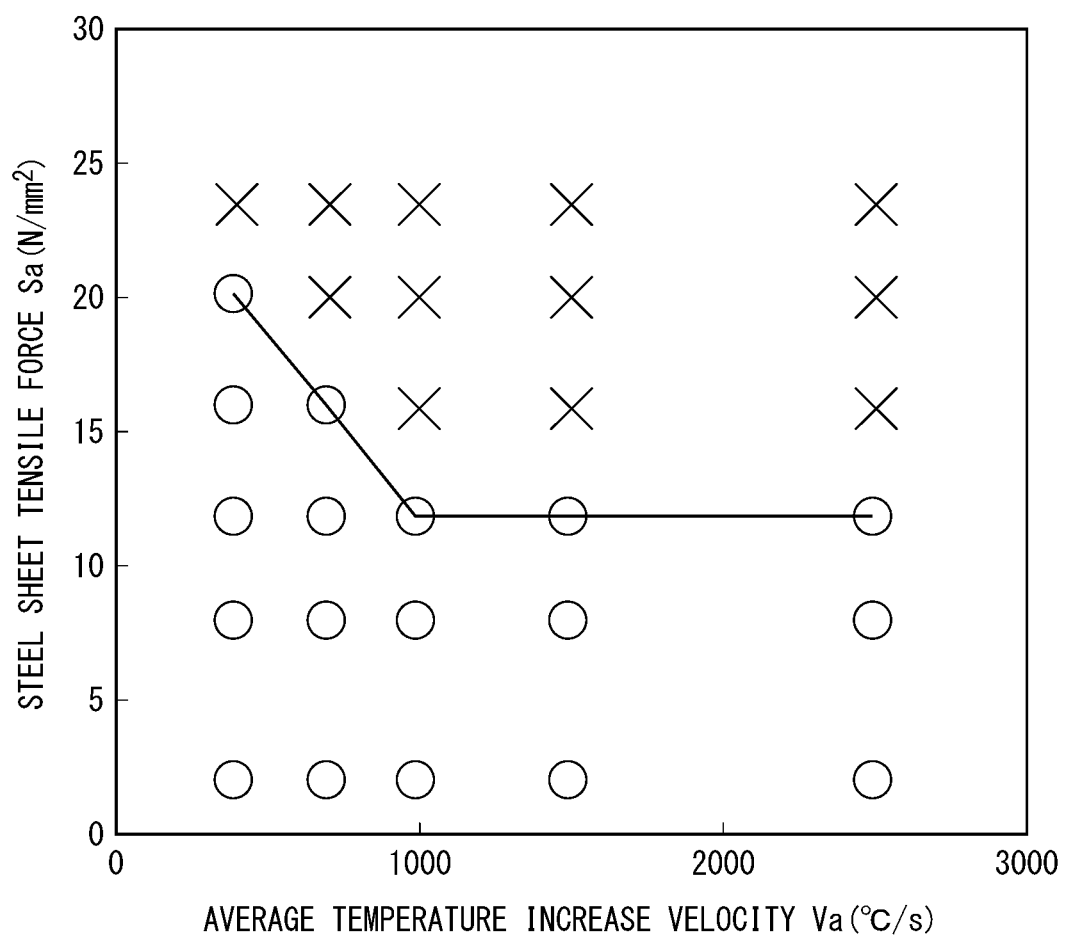

METHOD FOR MANUFACTURING GRAIN-ORIENTED ELECTRICAL STEEL SHEET AND GRAIN-ORIENTED ELECTRICAL STEEL SHEET

TECHNICAL FIELD OF THE INVENTION

The present invention relates to a method for manufacturing a grain-oriented electrical steel sheet and a grain-oriented electrical steel sheet.

Priority is claimed on Japanese Patent Application No. 2018-052899, filed Mar. 20, 2018, the content of which is incorporated herein by reference.

RELATED ART

A grain-oriented electrical steel sheet is a steel sheet which contains 2% by mass to 5% by mass of Si and in which the orientations of crystal grains in the steel sheet are highly integrated along a {110}<001> orientation called a Goss orientation. Grain-oriented electrical steel sheets have excellent magnetic characteristics and are used as core materials and the like of stationary inductors such as transformers.

For such grain-oriented electrical steel sheets, a variety of development efforts are underway in order to improve the magnetic characteristics. Particularly, in response to the recent request for energy-saving, for grain-oriented electrical steel sheets, there has been a demand for an additional decrease in iron loss.

In the manufacturing of a grain-oriented electrical steel sheet, crystal orientations are controlled using a catastrophic grain growth phenomenon called secondary recrystallization. However, in order to appropriately control crystal orientations by secondary recrystallization, it is important to appropriately control primary recrystallization carried out ahead of secondary recrystallization.

For example, Patent Document 1 discloses a technique for decreasing the iron loss value of a grain-oriented electrical steel sheet by controlling the retention time in a temperature increase process for primary recrystallization annealing and the intervals of a magnetic domain refinement treatment. Patent Document 2 discloses a technique for decreasing the iron loss value of a grain-oriented electrical steel sheet by controlling the formation condition of an insulating coating imparting a tensile force to a grain-oriented electrical steel sheet. Patent Document 3 discloses a technique for manufacturing a grain-oriented electrical steel sheet having a decreased iron loss throughout the entire length of a coil by controlling a heat pattern in a temperature increase process for primary recrystallization annealing. Patent Document 4 discloses a technique for decreasing the iron loss value of a grain-oriented electrical steel sheet by strictly controlling the average grain size of crystal grains after secondary recrystallization and the deviation angle from an ideal orientation.

PRIOR ART DOCUMENT

Patent Document

[Patent Document 1] Japanese Unexamined Patent Application, First Publication No. 2014-194073
[Patent Document 2] PCT International Publication No. WO2013/75733
[Patent Document 3] PCT International Publication No. WO2014/049770
[Patent Document 4] Japanese Unexamined Patent Application, First Publication No. H7-268567

DISCLOSURE OF THE INVENTION

Problems to be Solved by the Invention

As disclosed in Patent Document 3, it is confirmed that, in the temperature increase process for primary recrystallization annealing, the magnetic characteristics of the grain-oriented electrical steel sheet can be improved by rapidly increasing the temperature from 500° C. to 600° C. at 100° C./s or more.

However, in Patent Documents 1 to 4, there are no studies regarding the influence on the magnetic characteristics of the grain-oriented electrical steel sheet generated in the case of further increasing the temperature increase velocity for the rapid temperature increase in primary recrystallization annealing.

The rapid temperature increase in primary recrystallization annealing increases a variation in the iron loss value of the grain-oriented electrical steel sheet among coils. Therefore, in the case of rapidly increasing the temperature at a faster temperature increase velocity than in the related art, there is a case where a grain-oriented electrical steel sheet having a low iron loss cannot be obtained depending on other conditions for the primary recrystallization annealing and the conditions for steps in the later stage.

The present invention has been made in consideration of the above-described problem or the like, and an object of the present invention is to provide a new and improved method for manufacturing a grain-oriented electrical steel sheet capable of manufacturing a grain-oriented electrical steel sheet having a lower iron loss in the case of rapidly increasing the temperature of the grain-oriented electrical steel sheet at a faster temperature increase velocity than in the related art in primary recrystallization annealing, and a grain-oriented electrical steel sheet manufactured using the above-described manufacturing method.

Means for Solving the Problem

A summary of the present invention is described below.
[1] A method for manufacturing a grain-oriented electrical steel sheet according to one aspect of the present invention includes:
a step of heating a slab having
a component composition containing, by mass %,
C: 0.02% or more and 0.10% or less,
Si: 2.5% or more and 4.5% or less,
Mn: 0.01% or more and 0.15% or less,
S and Se in total: 0.001% or more and 0.050% or less,
acid-soluble Al: 0.01% or more and 0.05% or less,
N: 0.002% or more and 0.015% or less,
Cu: 0% or more and 0.30% or less,
Sn: 0% or more and 0.30% or less,
Ni: 0% or more and 0.30% or less,
Cr: 0% or more and 0.30% or less, and
Sb: 0% or more and 0.30% or less,
with a remainder including Fe and impurities to 1,280° C. to 1,450° C. and carrying out hot rolling to obtain a hot-rolled steel sheet,
a step of carrying out pickling on the hot-rolled steel sheet to obtain a pickled sheet, or carrying out hot-rolled sheet annealing on the hot-rolled steel sheet to obtain a hot-rolled annealed sheet and pickling on the hot-rolled annealed sheet to obtain a pickled sheet;
a step of carrying out cold rolling on the pickled sheet to obtain a cold-rolled steel sheet;

a step of carrying out primary recrystallization annealing on the cold-rolled steel sheet;

a step of applying an annealing separating agent including MgO to a surface of the cold-rolled steel sheet after the primary recrystallization annealing and then carrying out final annealing to obtain a final-annealed sheet; and a step of applying an insulating coating to the final-annealed sheet and then carrying out flattening annealing, in which, in the pickling, an amount of a sheet thickness decreased of the hot-rolled steel sheet or the hot-rolled annealed sheet is 5 μm or more and 150 μm or less, in a rapid temperature increase for the primary recrystallization annealing, a dew point temperature of an atmosphere is 0° C. or lower, an average temperature increase velocity Va (° C./s) in a temperature range of 550° C. to 700° C. is 400≤Va≤3000, a tensile force Sa (N/mm) imparted in a sheet travelling direction of the cold-rolled steel sheet is 1.96≤Sa≤(25.5−0.0137×Va) in the case of Va≤1000 and the tensile force Sa is 1.965≤Sa≤11.8 in the case of V≥1000, and in the flattening annealing, a temperature Af (° C.) to be reached during the annealing is 800≤Af≤950, a holding time Tf(s) at 800° C. or higher is 10≤Tf≤5100, and a steel sheet tensile force Cf (N/mm$^2$) imparted in a sheet travelling direction of the final-annealed sheet during the flattening annealing is 3.92≤Cf≤11.8.

[2] The method for manufacturing a grain-oriented electrical steel sheet according to [1], in which the component composition of the slab may contain, by mass %, one or more of Cu: 0.01% or more and 0.30% or less,
Sn: 0.01% or more and 0.30% or less,
Ni: 0.01% or more and 0.30% or less,
Cr: 0.01% or more and 0.30% or less, and
Sb: 0.01% or more and 0.30% or less.

[3] A grain-oriented electrical steel sheet according to another aspect of the present invention having:

a silicon steel sheet,
a forsterite coating disposed on the silicon steel sheet, and
an insulating film disposed on the forsterite coating, in which the silicon steel sheet has a component composition containing, by mass %, Si: 2.5% or more and 4.5% or less,
Mn: 0.01% or more and 0.15% or less,
C: 0% or more and 0.0050% or less,
S and Se in total: 0% or more and 0.005% or less,
acid-soluble Al: 0% or more and 0.01% or less,
N: 0% or more and 0.005% or less
Cu: 0% or more and 0.30% or less,
Sn: 0% or more and 0.30% or less,
Ni: 0% or more and 0.30% or less,
Cr: 0% or more and 0.30% or less, and
Sb: 0% or more and 0.30% or less,
with a remainder including Fe and impurities, an average grain size of secondary recrystallized grains in the silicon steel sheet is 10 mm or more and 50 mm or less, and the grain-oriented electrical steel sheet has
a sheet thickness of 0.15 mm or more and 0.23 mm or less,
an iron loss Wp of 0.800 W/kg or less in terms of $W_{17/50}$,
Wp/Wd of 1.03 or more and 1.15 or less in term of $W_{17/50}$, the Wp/Wd being a ratio of the iron loss Wp to an iron loss Wd in the case of being magnetic domain-refined, and
a magnetic flux density B8 value of 1.930 T or more.

[4] The grain-oriented electrical steel sheet according to [3], in which the component composition of the silicon steel sheet may contain, by mass, one or more of Cu: 0.01% or more and 0.30% or less,
Sn: 0.01% or more and 0.30% or less,
Ni: 0.01% or more and 0.30% or less,
Cr: 0.01% or more and 0.30% or less, and
Sb: 0.01% or more and 0.30% or less.

Effects of the Invention

According to an aspect of the present invention, it is possible to manufacture a grain-oriented electrical steel sheet having a lower iron loss. Specifically, according to one aspect of the present invention, after the primary recrystallization annealing, crystal grains in a Goss orientation having favorable magnetic characteristics increase, and thus it is possible to manufacture a grain-oriented electrical steel sheet in which the diameters of crystal grains are decreased while improving the integration degree of crystal grains after secondary recrystallization in the Goss orientation. Therefore, it is possible to manufacture a grain-oriented electrical steel sheet having a further decreased iron loss value. In addition, according to another aspect of the present invention, it is possible to provide a grain-oriented electrical steel sheet having a decreased iron loss even when a magnetic domain refinement treatment is not carried out.

BRIEF DESCRIPTION OF THE DRAWINGS

FIG. 1 is a graph obtained by indicating an average temperature increase velocity Va along the horizontal axis, indicating a steel sheet tensile force Sa along the vertical axis, and plotting the results of examples shown in Table 1.

EMBODIMENTS OF THE INVENTION

Hereinafter, a preferred embodiment of the present invention will be described in detail. However, the present invention is not limited only to a configuration disclosed in the present embodiment and can be modified in a variety of manners within the scope of the gist of the present invention.

As a result of intensive studies regarding a grain-oriented electrical steel sheet and a method for manufacturing the grain-oriented electrical steel sheet in order to improve the magnetic characteristics of the grain-oriented electrical steel sheet, the present inventors found the following.

The present inventors found that a decrease in the iron loss value of a grain-oriented electrical steel sheet that the present inventors desire can be realized for the first time by setting the temperature increase velocity in the primary recrystallization annealing to 400° C./s or more, controlling the atmosphere and the steel sheet tensile force during the rapid temperature increase, and, furthermore, strictly controlling the amount of the sheet thickness decrease at the time of carrying out pickling on a hot-rolled steel sheet (or a hot-rolled annealed sheet) and the conditions in flattening annealing.

The flattening annealing refers to an annealing step of applying an insulating coating to a steel sheet and then carrying out the baking of the applied insulating coating and the flattening of the steel sheet at the same time.

In consideration of the above-described knowledge, the present inventors found the present invention. The summary of the present invention is as described below.

A method for manufacturing a grain-oriented electrical steel sheet including: a step of heating a slab having
a component composition containing, by mass %,
C: 0.02% or more and 0.10% or less,
Si: 2.5% or more and 4.5% or less,
Mn: 0.01% or more and 0.15% or less,
S and Se in total: 0.001% or more and 0.050% or less,
acid-soluble Al: 0.01% or more and 0.05% or less,
N: 0.002% or more and 0.015% or less,
Cu: 0% or more and 0.30% or less,
Sn: 0% or more and 0.30% or less,
Ni: 0% or more and 0.30% or less,
Cr: 0% or more and 0.30% or less, and
Sb: 0% or more and 0.30% or less,
with a remainder including Fe and impurities to 1,280° C. to 1,450° C. and carrying out hot rolling to obtain a hot-rolled steel sheet, a step of carrying out pickling on the hot-rolled steel sheet to obtain a pickled sheet, or carrying out hot-rolled sheet annealing on the hot-rolled steel sheet to obtain a hot-rolled annealed sheet and pickling on the hot-rolled annealed sheet to obtain a pickled sheet;

a step of carrying out cold rolling on the pickled sheet to obtain a cold-rolled steel sheet;

a step of carrying out primary recrystallization annealing on the cold-rolled steel sheet;

a step of applying an annealing separating agent including MgO to a surface of the cold-rolled steel sheet after the primary recrystallization annealing and then carrying out final annealing to obtain a final-annealed sheet; and a step of applying an insulating coating to the final-annealed sheet and then carrying out flattening annealing, in which, in the pickling, the amount of a sheet thickness decrease of the hot-rolled steel sheet or the hot-rolled annealed sheet is 5 μm or more and 150 μm or less, in a rapid temperature increase for the primary recrystallization annealing, a dew point temperature of an atmosphere is 0° C. or lower, an average temperature increase velocity Va (° C./s) in a temperature range of 550° C. to 700° C. is $400 \leq Va \leq 3000$, a tensile force Sa (N/mm$^2$) imparted in a sheet travelling direction of the cold-rolled steel sheet is $1.965 \leq Sa \leq (25.5 - 0.0137 \times Va)$ in the case of $Va \leq 1000$ and the tensile force Sa is $1.96 \leq Sa \leq 11.8$ in the case of $Va \geq 1000$, and in the flattening annealing, a temperature Af (° C.) to be reached during the annealing is $800 \leq Af \leq 950$, a holding time Tf(s) at 800° C. or higher is $10 \leq Tf \leq 100$, and a steel sheet tensile force Cf (N/mm$^2$) imparted in a sheet travelling direction of the final-annealed sheet during the flattening annealing is $3.92:5 \leq Cf \leq 11.8$.

In addition, in the grain-oriented electrical steel sheet according to the present embodiment, the average grain size of secondary recrystallized grains in a silicon steel sheet is 10 mm or more and 50 mm or less, the sheet thickness is 0.15 mm or more and 0.23 mm or less, an iron loss Wp in the case of not carrying out a magnetic domain refinement treatment is 0.800 W/kg or less in terms of $W_{17/50}$, Wp/Wd that is the ratio of Wp to an iron loss Wd in the case of carrying out the magnetic domain refinement treatment is 1.03 or more and 1.15 or less in term of $W_{17/50}$, and the magnetic flux density B8 value is 1.930 T or more. As such, in the grain-oriented electrical steel sheet according to the present embodiment, Wp/Wd is small. This is because the iron loss of the grain-oriented electrical steel sheet according to the present embodiment is efficiently decreased and thus the effect of the magnetic domain refinement treatment for decreasing the iron loss is small. That is, in the grain-oriented electrical steel sheet according to the present embodiment, the iron loss is sufficiently decreased even when a magnetic domain refinement treatment is not carried out.

The magnetic domain refinement treatment is capable of decreasing the iron loss value of the grain-oriented electrical steel sheet, but increases noise in transformers in which the grain-oriented electrical steel sheet is used for a core material. Therefore, according to the grain-oriented electrical steel sheet according to the present embodiment, it is possible to decrease noise while improving the magnetic characteristics of a transformer.

Hereinafter, the method for manufacturing a grain-oriented electrical steel sheet according to the present embodiment will be specifically described.

First, the component composition of the slab used in the grain-oriented electrical steel sheet according to the present embodiment will be described. Hereinafter, unless particularly otherwise described, the "%" sign indicates "% by mass". Numerical limitation ranges described below include the lower limit value and the upper limit value in the ranges. Numerical values expressed using "more than" or "less than" are not included in numerical ranges. The "%" sign regarding the chemical composition of the steel sheet all indicates "% by mass", and the "%" sign regarding the gas composition all indicates "% by vol".

The amount of carbon (C) is 0.02% or more and 0.10% or less. C has a variety of functions, and, in a case where the amount of C is less than 0.02%, the crystal grain diameters become excessively large during the heating of the slab, which increases the iron loss value of the grain-oriented electrical steel sheet. In a case where the amount of C is more than 0.10%, at the time of decarburization after the cold rolling, the decarburization time becomes long, and the manufacturing cost increases. In addition, in a case where the amount of C is more than 0.10%, decarburization is likely to become incomplete, and there is a case where the grain-oriented electrical steel sheet causes magnetic aging. Therefore, the amount of C is 0.02% or more and 0.10% or less. The amount is preferably 0.05% or more and 0.09% or less.

The amount of silicon (Si) is 2.5% or more and 4.5% or less. Si increases the electrical resistance of the steel sheet, thereby decreasing the eddy-current loss of the grain-oriented electrical steel sheet and decreasing the iron loss. In a case where the amount of Si is less than 2.5%, it becomes difficult to sufficiently decrease the eddy-current loss of the grain-oriented electrical steel sheet. In a case where the amount of Si is more than 4.5%, the workability of the grain-oriented electrical steel sheet is degraded. Therefore, the amount of Si is 2.5% or more and 4.5% or less. The amount is preferably 2.7% or more or 4.0% or less.

The amount of manganese (Mn) is 0.01% or more and 0.15% or less. Mn forms MnS, MnSe, and the like that are inhibitors determining secondary recrystallization. In a case where the amount of Mn is less than 0.01%, the absolute amount of MnS and MnSe causing secondary recrystallization lacks, and it is not possible to preferably control orientations. In a case where the amount of Mn is more than 0.15%, the formation of a solid solution of Mn becomes difficult during the beating of the slab, and it is not possible to preferably control an inhibitor. In addition, in a case where the amount of Mn is more than 0.15%, the precipitation sizes of MnS and MnSe that are inhibitors are likely to coarsen, the optimal size distribution as an inhibitor is impaired, and it is not possible to preferably control orientations. Therefore, the amount of Mn is 0.01% or more and 0.15% or less. The amount is preferably 0.03% or more or 0.13% or less.

The amount of sulfur (S) and selenium (Se) is 0.001% or more and 0.050% or less in total. S and Se form the inhibitors together with Mn. S and Se may be both contained in the slab, but at least one needs to be contained in the slab. In a case where the total of the amounts of S and Se is less than 0.001% or more than 0.050%, a sufficient inhibitor effect cannot be obtained, and it is not possible to preferably control orientations. Therefore, the amount of S and Se is 0.001% or more and 0.050% or less in total. The amount is preferably 0.005% or more or 0.040% or less.

The amount of acid-soluble aluminum (acid-soluble Al) is 0.010% or more and 0.05% or less. The acid-soluble Al forms an inhibitor necessary to manufacture grain-oriented electrical steel sheet having a high magnetic flux density. In a case where the amount of the acid-soluble Al is less than 0.01%, the inhibitor strength lacks, and it is not possible to preferably control orientations. In a case where the amount of the acid-soluble Al is more than 0.05%, AlN precipitated as an inhibitor coarsens, the inhibitor strength decreases, and it is not possible to preferably control orientations. Therefore, the amount of the acid-soluble Al is 0.01% or more and 0.05% or less. The amount is preferably 0.02% or more or 0.04% or less.

The amount of nitrogen (N) is 0.002% or more and 0.015% or less. N forms AlN that is an inhibitor together with the acid-soluble Al. In a case where the amount of N is not in the above-described range, a sufficient inhibitor effect cannot be obtained, and it is not possible to preferably control orientations. Therefore, the amount of N is 0.002% or more and 0.015% or less. The amount is preferably 0.005% or more or 0.012% or less.

The remainder of the slab used to manufacture the grain-oriented electrical steel sheet according to the present embodiment is Fe and impurities. The slab used to manufacture the grain-oriented electrical steel sheet according to the present embodiment may contain, in addition to the above-described elements, any one or more of Cu, Sn, Ni, Cr, and Sb as an element that stabilizes secondary recrystallization instead of some of Fe which is the remainder. It is not necessary to limit the lower limit value of these selective elements, and the lower limit value may be 0%.

The amount of each of Cu, Sn, Ni, Cr, and Sb may be 0.01% or more and 0.30% or less. In a case where the amount of even one element among these elements is 0.01% or more, it is possible to sufficiently obtain an effect for stabilizing secondary recrystallization, and it is possible to further decrease the iron loss value of the grain-oriented electrical steel sheet. In a case where the amount of even one element among these elements is more than 0.30%, the effect for stabilizing secondary recrystallization is saturated, and the manufacturing cost increases, which is not preferable.

Next, a method for manufacturing a grain-oriented electrical steel sheet using the above-described slab will be described.

The slab is manufactured by casting molten steel adjusted to the above-described component composition. A method for casting the slab is not particularly limited. The slab may be cast using a casting method, for example, an ordinary continuous casting method, an ordinary ingot method, an ordinary thin slab casting method, or the like. In the case of continuous casting, steel may be once cooled to a low temperature (for example, room temperature), reheated, and then hot-rolled or steel immediately after steel (cast slab) may be continuously hot-rolled. In addition, in research and development, the same effect on the component composition as that in a case where the slab is formed is confirmed even in a case where a steel ingot is formed in a vacuum melting furnace or the like.

Subsequently, the slab is heated to 1,280° C. or higher, thereby forming a solid solution of an inhibitor component in the slab. In a case where the heating temperature of the slab is lower than 1,280° C., it becomes difficult to sufficiently form a solution of the inhibitor component such as MnS, MnSe, and AlN, and it is not possible to preferably control orientations. The heating temperature of the slab is preferably 1,300° C. or higher. The upper limit value of the heating temperature of the slab is not particularly regulated, but may be set to 1,450° C. or lower from the viewpoint of facility protection.

The heated slab is hot-rolled, thereby obtaining a hot-rolled steel sheet. The sheet thickness of the hot-rolled steel sheet may be, for example, 1.8 mm or more and 3.5 mm or less. In a case where the sheet thickness of the hot-rolled steel sheet is less than 1.8 mm, the steel sheet temperature after hot rolling becomes a low temperature, and the amount of AlN precipitated in the steel sheet increases, whereby secondary recrystallization becomes unstable and magnetic characteristics are degraded in a grain-oriented electrical steel sheet that is obtained in the end and has a sheet thickness of 0.23 mm or less, which is not preferable. In a case where the sheet thickness of the hot-rolled steel sheet is more than 3.5 mm, the rolling load in a cold rolling step increases, which is not preferable.

Hot-rolled sheet annealing is carried out on the hot-rolled steel sheet as necessary, thereby obtaining a hot-riled annealed sheet. When the hot-rolled sheet annealing is carried out on the hot-rolled steel sheet, the steel sheet shape becomes more favorable, and thus it is possible to reduce the possibility of the steel sheet being fractured by subsequent cold rolling. The hot-rolled sheet annealing may be omitted in a case where process annealing is carried out in cold rolling. However, even in such a case, the hot-rolled sheet annealing is preferably carried out in order to reduce the possibility of the steel sheet being fractured by cold rolling. The conditions for the hot-rolled sheet annealing are not particularly limited and may be ordinary conditions, and the hot-rolled steel sheet after hot rolling needs to be soaked at 750° C. to 1,200° C. for 10 seconds to 10 minutes in the case of continuous annealing and soaked at 650° C. to 950° C. for 30 minutes to 24 hours in the case of box annealing.

Pickling is carried out on the hot-rolled steel sheet or the hot-rolled annealed sheet in a case where the hot-rolled sheet annealing has been carried out on the hot-rolled steel sheet such that the amount of the sheet thickness decrease reaches 5 μm or more and 150 μm or less, thereby obtaining a pickled sheet. In a case where the amount of the sheet thickness decrease is less than 5 μm, an oxide (scale) formed on the surface of the steel sheet during the hot rolling and the hot-rolled sheet annealing or process annealing described below is not sufficiently removed, and, in cold rolling to be carried out after the pickling, the steel sheet is worn or a surface defect is generated by a rolling roll. In a case where the amount of the sheet thickness decrease is more than 150 μm, the decarburization property in decarburization annealing deteriorates, and the amount of C in the grain-oriented electrical steel sheet to be obtained in the end increases, and thus magnetic aging is caused, and the magnetic characteristics deteriorate.

In a case where the amount of the sheet thickness decrease in the pickling is more than 150 μm, a cause for the deterioration of the decarburization property in the decarburization annealing is the removal of a silica-removed layer in the vicinity of the surface of the steel sheet formed during the hot rolling and the hot-rolled sheet annealing or process annealing described below. During the hot rolling, the hot-rolled sheet annealing, and the process annealing, an iron oxide or firelight ($Fe_2SiO_4$) is formed on the surface of the steel sheet. Here, the formation of firelight accompanies the diffusion of Si in the vicinity of the surface of the steel sheet into the surface, and thus a region in which the amount of Si decreased, that is, the silica-removed layer is formed in the vicinity of the surface of the steel sheet. In a case where the silica-removed layer is cold-rolled and remains even during the decarburization annealing, the formation of externally oxidized $SiO_2$ on the surface of the steel sheet during rapid heating is suppressed. Therefore, in the decarburization annealing, the decarburization property is not impaired. In a case where the silica-removed layer is removed by pickling, externally oxidized $SiO_2$ is formed on the surface of the steel sheet during rapid heating, and thus the decarburization property is impaired in the decarburization annealing.

The kind of an acid in the pickling is not particularly limited, and sulfuric acid, hydrochloric acid, nitric acid, and the like are exemplified. The amount of the sheet thickness decrease may be adjusted using the concentration of the acid and the immersion time. For example, the steel sheet may be immersed in a sulfuric acid solution with a concentration of 10% by mass for 10 seconds or longer and 10 minutes or shorter.

The amount of the sheet thickness decrease in the pickling may be obtained by measuring the sheet thickness before and after the pickling using radioactive rays or the like or may be converted from the weight of the steel sheet. In a case where the hot rolling and the pickling are continuously carried out, the amount of the sheet thickness decrease may be obtained from the weights of the steel sheet before the hot rolling and after the pickling or may be converted and obtained from the coil diameter and the number of turns of the steel sheet. In a case where the hot-rolled sheet annealing and the pickling, or the process annealing described below, and the pickling, are continuously carried out, simply, the amount of the sheet thickness decrease may be converted and obtained from the weights of the steel sheet before the hot-rolled sheet annealing and after the pickling or the weights of the steel sheet before the process annealing and after the pickling or may be converted and obtained from the coil diameter and the number of turns of the steel sheet. In addition, in order to accelerate the pickling property, a shot blast treatment or the like may be carried out before the pickling treatment.

Cold rolling is carried out on the pickled sheet, thereby obtaining a cold-rolled steel sheet. The cold rolling may be carried out only once or a plurality of times. In the case of carrying out the cold rolling a plurality of times, process annealing may be carried out between cold rolling operations. In the case of carrying out the cold rolling a plurality of times or carrying out the cold rolling a plurality of times with process annealing therebetween, the cold rolling is carried out a plurality of times on the hot-rolled steel sheet or the hot-rolled annealed sheet or the cold rolling is carried out a plurality of times with process annealing therebetween on the hot-rolled steel sheet or the hot-rolled annealed sheet, and the above-described pickling is carried out before the final cold rolling is carried out, thereby obtaining a pickled sheet, and the final cold rolling is carried out on the pickled sheet. In addition, it is also possible to carry out the pickling on the hot-rolled steel sheet or the hot-rolled annealed sheet, then, carry out the cold rolling a plurality of times with process annealing therebetween, carry out the pickling again, and then carry out the final cold rolling. In this case, the pickling needs to be carried out such that the amount of the sheet thickness decrease during the pickling before the final cold rolling reaches 5 μm or more and 150 μm or less.

Between the passes of cold rolling, between rolling roll stands, or during rolling, a heating treatment may be carried out on the hot-rolled steel sheet or the hot-rolled annealed sheet at approximately 300° C. or lower. In such a case, it is possible to further improve the magnetic characteristics of a grain-oriented electrical steel sheet to be obtained in the end. The hot-rolled steel sheet or the hot-rolled annealed sheet may be rolled by carrying out cold rolling three or more times, but carrying out cold rolling multiple times increases the manufacturing cost, and thus the hot-rolled steel sheet or the hot-rolled annealed sheet is preferably rolled by carrying out cold rolling once or twice.

After the temperature is rapidly increased, the cold-rolled steel sheet is decarburization-annealed. These processes (rapid temperature increase and decarburization annealing) are also referred to as primary recrystallization annealing and preferably continuously carried out. When the primary recrystallization annealing is carried out, in the cold-rolled steel sheet, it is possible to increase Goss orientation grains before secondary recrystallization and decrease crystal grain diameters after secondary recrystallization.

In the method for manufacturing a grain-oriented electrical steel sheet according to the present embodiment, in the rapid temperature increase of the cold-rolled steel sheet for the primary recrystallization annealing, the average temperature increase velocity Va in a temperature range of 550° C. to 700° C. is set to 400° C./s or more. In such a case, in the present embodiment, it is possible to further increase Goss orientation grains before the secondary recrystallization of the cold-rolled steel sheet and decrease crystal grain diameters after secondary recrystallization.

In a case where the average temperature increase velocity Va in a temperature range of 550° C. to 700° C. is set to 700° C./s or more, Goss orientation grains before the secondary recrystallization can be further increased, and it is possible to further decrease the iron loss of a grain-oriented electrical steel sheet to be obtained in the end. On the other hand, in a case where the average temperature increase velocity Va in the above-described temperature range is set to less than 400° C./s, it becomes difficult to form a sufficient amount of Goss orientation grains in order to decrease crystal grain diameters after secondary recrystallization, and the iron loss of a grain-oriented electrical steel sheet to be obtained in the end increases. The upper limit of the average temperature increase velocity Va in a temperature range of 550° C. to 700° C. does not need to be particularly limited, but may be set to 3,000° C./s from the viewpoint of facility and manufacturing costs.

The rapid temperature increase as described above can be performed by using, for example, an energization heating method or an induction heating method.

In the method for manufacturing a grain-oriented electrical steel sheet according to the present embodiment, the effect of the rapid temperature increase for increasing Goss orientation grains before the secondary recrystallization is sufficiently obtained by controlling the tensile force Sa imparted in the sheet travelling direction of the steel sheet (that is, the steel sheet tensile force) during the rapid temperature increase for the primary recrystallization annealing. In the present embodiment, relative to the average temperature increase velocity Va (° C./s) in the rapid temperature increase, the steel sheet tensile force S (N/mm$^2$) in the temperature increase process for the primary recrystallization annealing is set to $1.965 \leq Sa \leq (25.5-0.0137 \times Va)$ in the case of $Va \leq 1000$ and to $1.965 \leq S \leq 11.8$ in the case of $Va > 1000$.

In a case where the steel sheet tensile force Sa exceeds the upper limit value dependent on the average temperature increase velocity Va, due to the tensile force imparted in the sheet travelling direction of the cold-rolled steel sheet, the texture of crystal grains generated by primary recrystallization is disturbed, and it is not possible to decrease the iron loss of the grain-oriented electrical steel sheet. On the other hand, in a case where the steel sheet tensile force Sa is less than 1.96 N/mm$^2$, the cold-rolled steel sheet being threaded meanders and thus there is a possibility that the cold-rolled steel sheet may break or a facility may be damaged.

In the rapid temperature increase for the primary recrystallization annealing, the dew point temperature of the atmosphere is set to 0° C. or lower. When the dew point temperature of the atmosphere is higher than 0° C., externally oxidized SiO$_2$ is formed on the surface of the steel sheet, and the decarburization property during the subsequent decarburization annealing is impaired. The lower limit of the dew point temperature of the atmosphere does not need to be particularly limited and may be set to −50° C. from the viewpoint of a facility and the manufacturing cost. The oxygen concentration in the atmosphere may be set to 0.05% or less and may be more preferably set to 0.03% or less. The oxygen concentration is preferably low; however, from the viewpoint of a facility and the manufacturing cost, the lower limit may be set to 0.0001%. The atmosphere gas composition may contain nitrogen as a main component and may further contain argon or helium. In addition, the atmosphere gas composition may contain hydrogen in order to improve the reduction property of the atmosphere.

In a case where the amount of the sheet thickness decrease during the pickling and the dew point temperature of the atmosphere for the rapid temperature increase are not strictly controlled, externally oxidized SiO$_2$ is formed on the surface of the steel sheet by the rapid temperature increase. The detail of the reason therefor is not clear, but is assumed to be because, in a case where the temperature increase velocity is fast, the residence time in a low-temperature region in which an iron-based oxide is formed becomes short and the formation of externally oxidized SiO$_2$ on the surface of the steel sheet is accelerated. In a case where the temperature increase velocity is slow, it is assumed that, in a low-temperature region, an iron-based oxide is formed on the surface of the steel sheet earlier than externally oxidized SiO$_2$ and thus the formation of externally oxidized SiO$_2$ is impaired.

On the cold-rolled steel sheet having a rapidly increased temperature, decarburization annealing is carried out for 30 seconds to 10 minutes at a temperature of 900° C. or lower in a hydrogen and nitrogen-containing wet atmosphere. In the primary recrystallization annealing made up of the rapid temperature increase and the decarburization annealing, subsequent to the decarburization annealing, reduction annealing may be carried out on the cold-rolled steel sheet for the purpose of improving the magnetic characteristics and coating characteristics. The rapid temperature increase and the decarburization annealing may be provided as separate steps, but may be continuously carried out from the viewpoint of omitting a manufacturing line. In the case of continuously carrying out the rapid temperature increase and the decarburization annealing, the rapid temperature increase and the decarburization annealing may be connected to each other using a throat or the like, and the dew point temperature in the throat may be set to 0° C. or lower.

An annealing separating agent including MgO as a main component is applied to the cold-rolled steel sheet after the primary recrystallization annealing, and then final annealing is carried out, thereby obtaining a final-annealed sheet. In the final annealing, secondary recrystallization occurs. In addition, the final annealing is carried out after the application of the annealing separating agent, and thus a forsterite coating is formed on the surface of the silicon steel sheet. The final annealing may be carried out by, for example, holding a coil-shaped cold-rolled steel sheet imparted with the annealing separating agent for 20 hours or longer at a temperature of 800° C. to 1,000° C. using a batch-type heating furnace or the like. Furthermore, in order to further decrease the iron loss value of a grain-oriented electrical steel sheet to be obtained in the end, a purification annealing in which the temperature of the coil-shaped final-annealed sheet is increased up to a temperature of approximately 1,200° C. and then the sheet is held may be carried out.

The average temperature increase velocity in a temperature increase process for the final annealing is not particularly limited and may be a condition for ordinary final annealing. For example, the average temperature increase velocity in the temperature increase process for the final annealing may be set to 5° C./h to 100° C./h from the viewpoint of productivity and general facility limitations. In addition, the temperature increase process for the final annealing may be carried out in a different well-known heat pattern. The atmosphere gas composition in the final annealing is not particularly limited. In a secondary recrystallization process during the final annealing, the atmosphere gas composition may be a gas mixture of nitrogen and hydrogen. The atmosphere may be a dried atmosphere or a wet atmosphere. The atmosphere gas composition of the purification annealing may be a dried hydrogen gas.

After the final annealing, for the purpose of imparting an insulating property and a tensile force to the steel sheet, for example, an insulating coating containing aluminum phosphate, colloidal silica, or the like as main components is applied to the surface of the final-annealed sheet. After that, for the purpose of the baking of the insulating coating and the flattening of the steel sheet shape deformed by the final annealing, flattening annealing is carried out. The component of the insulating coating is not particularly limited as long as an insulating property and a tensile force are imparted to the final-annealed sheet.

In the method for manufacturing a grain-oriented electrical steel sheet according to the present embodiment, the temperature to be reached in the flattening annealing, the holding time at 800° C. or higher, and the steel sheet tensile force at the time of flattening annealing are strictly controlled in order to prevent the introduction of unnecessary stress to the grain-oriented electrical steel sheet. In such a case, in the manufacturing method according to the present embodiment, it is possible to manufacture a stable grain-oriented electrical steel sheet having a decreased iron loss value.

Specifically, the temperature Af to be reached in the flattening annealing is 800° C. or higher and 950° C. or lower. In the flattening annealing, in a case where the temperature Af to be reached is lower than 800° C., the shape of the grain-oriented electrical steel sheet is not completely corrected, and it becomes difficult to sufficiently flatten the grain-oriented electrical steel sheet. In the case where the temperature Af to be reached is higher than 950°

C., stress is introduced to the grain-oriented electrical steel sheet, and thus the possibility of an increase in the iron loss increases.

A holding time Tf at 800° C. or higher in the flattening annealing is 10 seconds or longer and 100 seconds or shorter. In a case where the holding time Tf at 800° C. or higher is shorter than 10 seconds, the shape of the grain-oriented electrical steel sheet is not completely corrected, and it becomes difficult to sufficiently flatten the grain-oriented electrical steel sheet. In a case where the holding time Tf at 800° C. or higher is longer than 100 seconds, stress is introduced to the grain-oriented electrical steel sheet, and thus the possibility of an increase in the iron loss increases.

A steel sheet tensile force Cf at the time of the flattening annealing is 3.92 N/mm or more and 11.8 N/mm or less. In a case where the steel sheet tensile force Cf in the flattening annealing is less than 3.92 N/mm$^2$, the shape of the grain-oriented electrical steel sheet is not completely corrected, and it becomes difficult to sufficiently flatten the grain-oriented electrical steel sheet. In a case where the steel sheet tensile force Cf in the flattening annealing is more than 11.8 N/mm$^2$, stress is introduced to the grain-oriented electrical steel sheet, and thus the iron loss increases.

The grain-oriented electrical steel sheet can be manufactured using the above-described manufacturing method. The grain-oriented electrical steel sheet according to one embodiment of the present invention manufactured using the above-described manufacturing method has a silicon steel sheet, a forsterite coating disposed on the silicon steel sheet, and an insulating film disposed on the forsterite coating. First, the silicon steel sheet will be described.

The silicon steel sheet has a component composition containing, by mass %,

Si: 2.5% or more and 4.5% or less,
Mn: 0.01% or more and 0.15% or less,
C: 0% or more and 0.0050% or less,
S and Se in total: 0% or more and 0.005% or less,
acid-soluble Al: 0% or more and 0.01% or less,
N: 0% or more and 0.005% or less
Cu: 0% or more and 0.30% or less,
Sn: 0% or more and 0.30% or less,
Ni: 0% or more and 0.30% or less,
Cr: 0% or more and 0.30% or less, and
Sb: 0% or more and 0.30% or less,
with a remainder including Fe and impurities,
an average grain size of secondary recrystallized grains in the silicon steel sheet is 10 mm or more and 50 mm or less, and the grain-oriented electrical steel sheet has
a sheet thickness of 0.15 mm or more and 0.23 mm or less,
an iron loss Wp of 0.800 W/kg or less in terms of W$_{17/50}$.
Wp/Wd of 1.03 or more and 1.15 or less in term of W$_{17/50}$,
the Wp/Wd being a ratio of the iron loss Wp to an iron loss Wd in the case of being magnetic domain-refined, and
a magnetic flux density B8 value of 1.930 T or more.

In the grain-oriented electrical steel sheet according to the present embodiment, in order to decrease the iron loss even without carrying out a magnetic domain refinement treatment, it is important to control the amounts of, among the component composition contained in the silicon steel sheet of the grain-oriented electrical steel sheet, Si, Mn, and C.

Si increases the electrical resistance of the silicon steel sheet, thereby decreasing the eddy-current loss configuring a part of the iron loss. The amount of Si contained in the silicon steel sheet is desirably in a range of 2.5% or more and 4.5% or less by mass %. The amount is preferably 2.7% or more or 4.0% or less. In a case where the amount of Si is less than 2.5%, it becomes difficult to suppress the eddy-current loss of the grain-oriented electrical steel sheet. In a case where the amount of Si is more than 4.5%, the workability of the grain-oriented electrical steel sheet is degraded.

Mn forms MnS or MnSe that is an inhibitor determining secondary recrystallization. The amount of Mn contained in the silicon steel sheet is desirably in a range of 0.01% or more and 0.15% or less by mass %. The amount is preferably 0.03% or more or 0.13% or less. In a case where the amount of Mn is less than 0.01%, the absolute amount of MnS and MnSe causing secondary recrystallization lacks, and it is not possible to preferably control orientations. In a case where the amount of Mn is more than 0.15%, the formation of a solid solution of Mn becomes difficult during the heating of the slab, and the precipitation size of the inhibitor coarsens, and thus the optimal size distribution of the inhibitor is impaired, and it is not possible to preferably control the inhibitors.

C is an effective element for a structure control until the completion of decarburization annealing in the manufacturing step. However, in a case where the amount of C is more than 0.0050% even after the decarburization annealing is carried out, magnetic aging is caused, and the magnetic characteristics of the grain-oriented electrical steel sheet are degraded. Therefore, the amount of C is 0.0050% or less. The amount is preferably 0.0030% or less. The amount of C is preferably small; however, even when the amount of C is decreased to less than 0.0001%, the effect of the structure control is saturated, and the manufacturing cost increases. Therefore, the amount of C may be set to 0.0001% or more.

The remainder of the silicon steel sheet according to the present embodiment is Fe and impurities. The silicon steel sheet may contain, instead of some of Fe which is the remainder, S, Se, acid-soluble Al, and N, and, as an element that stabilizes secondary recrystallization, any one or more of Cu, Sn, Ni, Cr, and Sb. It is not necessary to limit the lower limit value of these selective elements, and the lower limit value may be 0%.

The amounts of S and Se are preferably small, but may be set to 0.005% or less in total. In a case where the amounts of S and Se are more than 0.005% in total, there is a case where magnetic aging is caused and the magnetic characteristics a degraded.

The amount of the acid-soluble Al is preferably small, but may be set to 0.01% or less. In a case where the amount of the acid-soluble Al is more than 0.01%, there is a case where magnetic aging is caused and the magnetic characteristics are degraded.

The amount of N is preferably small, but may be set to 0.005% or less. In a case where the amount of N is more than 0.005%, there is a case where magnetic aging is caused and the magnetic characteristics are degraded.

The amount of each of Cu, Sn, Ni, Cr, and Sb may be 0.01% or more and 0.30% or less. In a case where the amount of even one element among these elements is 0.01% or more, an effect for stabilizing secondary recrystallization is sufficiently obtained, and it is possible to further decrease the iron loss value and obtain more favorable magnetic characteristics. In a case where the amount of even one element among these elements is more than 0.30%, the effect for stabilizing secondary recrystallization is saturated, which is not preferable from the viewpoint of suppressing an increase in the manufacturing cost of the grain-oriented electrical steel sheet.

The component composition of the silicon steel sheet may be measured from a silicon steel sheet obtained by removing the insulating coating and the forsterite coating of the grain-oriented electrical steel sheet using inductively coupled plasma-atomic emission spectrometry (ICP-AES). C and S may be measured using an infrared absorption method after combustion, and N may be measured using an inert gas melting-thermal conductivity method.

A method for removing the insulating coating and the forsterite coating is specifically as described below. The grain-oriented electrical steel sheet is immersed in a sodium hydroxide aqueous solution of 20% by mass of NaOH and 80% by mass of $H_2O$ at 80° C. for 20 minutes, then, washed with water and dried, thereby removing the insulating coating of the grain-oriented electrical steel sheet. Next, the grain-oriented electrical steel sheet from which the insulating film has been removed is immersed in a hydrochloric acid aqueous solution of 20% by mass of HCl and 80% by mass of $H_2O$ at 50° C. for two minutes, then, washed with water and dried, thereby removing the forsterite coating of the grain-oriented electrical steel sheet and obtaining a silicon steel sheet. The time during which the grain-oriented electrical steel sheet is immersed in the sodium hydroxide aqueous solution or the hydrochloric aqueous solution may be changed depending on the thickness of the coating.

In the silicon steel sheet according to the present embodiment, the average grain size of secondary recrystallized grains is controlled. Specifically, in the silicon steel sheet according to the present embodiment, the average grain size of the secondary recrystallized grains is 10 mm or more and 50 mm or less.

In a case where the average grain size of the secondary recrystallized grains in the silicon steel sheet is more than 50 mm, the iron loss value (particularly, the eddy-current loss) of the grain-oriented electrical steel sheet becomes great. Therefore, the average grain size of secondary recrystallized grains in the silicon steel sheet is set to 50 mm or less. The average grain size is preferably set to 40 mm or less. The lower limit value of the average grain size of the secondary recrystallized grains may be set to 10 mm in order to satisfy the magnetic characteristics of the grain-oriented electrical steel sheet according to the present embodiment.

The average grain size of the secondary recrystallized grains in the silicon steel sheet can be measured using, for example, the following method.

First, the insulating coating and the forsterite coating of the grain-oriented electrical steel sheet are removed using the same method as the above-described method, thereby obtaining a silicon steel sheet. While the obtained silicon steel sheet is immersed in the hydrochloric acid aqueous solution, a pit shape is formed in accordance with crystal orientations on the surface of the steel sheet, and thus the steel structure of the silicon steel sheet can be observed. A test piece is cut out such that an observation surface reaches at least 60 mm in width and 300 mm in length, the steel structure of the silicon steel sheet exposed by the above-described method is observed, and grain boundaries between macroscopically observable crystal grains are traced using an oil-based pen. At least five images of the surface of the grain-oriented electrical steel sheet are acquired using a commercially available image scanner, and the acquired images are analyzed using commercially available image analysis software. The equivalent circle diameters of crystal grains of the grain-oriented electrical steel sheet in all of the images are measured by an image analysis, and then the average value of the measured equivalent circle diameters is computed, thereby obtaining the average grain size of the secondary recrystallized grains in the grain-oriented electrical steel sheet.

For small crystal grains that have a grain diameter of, for example less than 2 mm and are thus not easily visually specified, the grain diameters of the secondary recrystallized grains are not measured.

The forsterite coating contains $Mg_2SiO_4$ as a main component and includes a small amount of impurities or an additive included in the silicon steel sheet or the annealing separating agent and a by-product thereof.

The insulating film contains phosphate and colloidal silica as main elements and includes a small amount of an element or impurities diffused from the silicon steel sheet during the purification annealing and a by-product thereof. The component may be different as long as an insulating property and a tensile force imparted to the steel sheet can be obtained.

The sheet thickness of the grain-oriented electrical steel sheet of the present embodiment is 0.15 mm or more and 0.23 mm or less. In a case where the sheet thickness of the grain-oriented electrical steel sheet is less than 0.15 mm, the load of the cold rolling significantly increases. In a case where the sheet thickness of the grain-oriented electrical steel sheet is more than 0.23 mm, the iron loss deteriorates.

The sheet thickness of the grain-oriented electrical steel sheet may be measured and obtained using radioactive rays or the like. Simply, the sheet thickness may be converted and computed from the weight of the steel sheet using the density of iron after collecting a sample having a predetermined size by shearing from the grain-oriented electrical steel sheet. In addition, the sheet thickness may be converted and obtained from the coil diameter and the number of turns of the steel sheet. The density of iron is preferably selected depending on the amount of Si contained.

A magnetic flux density B8 value of the grain-oriented electrical steel sheet according to the present embodiment is 1.930 T or more. Here, the magnetic flux density B8 value refers to the average value of magnetic flux densities obtained by imparting a magnetic field of 800 A/m at 50 Hz to five or more samples collected from the grain-oriented electrical steel sheet.

In a case where the magnetic flux density B8 value of the grain-oriented electrical steel sheet is less than 1.930 T, the iron loss value (particularly, hysteresis loss) of the grain-oriented electrical steel sheet becomes great. The lower limit of the magnetic flux density B8 value of the grain-oriented electrical steel sheet is preferably 1.932 T. The upper limit value of the magnetic flux density B8 value is not particularly limited and may be set to, for example, 2.000 T. The magnetic characteristics of the grain-oriented electrical steel sheet such as the magnetic flux density can be measured using a well-known method. For example, the magnetic characteristics of the grain-oriented electrical steel sheet can be measured using a method based on an Epstein frame regulated by JIS C 2550:2011, a single sheet tester (SST) regulated by JIS C 2556:2015, or the like. In research and development, in a case where a steel ingot is formed in a vacuum melting furnace or the like, it becomes difficult to collect a test piece having the same size as a test piece manufactured using an actual facility. In this case, a test piece may be collected so as to be, for example, 60 mm in width and 300 mm in length and subjected to measurement on the basis of the single sheet tester. Furthermore, the obtained result may be multiplied by a conversion factor such that the same measurement value as in a method based on the Epstein frame can be obtained. In the present embodiment, the magnetic flux density value is measured using a measurement method based on the single sheet tester.

As described above, the grain-oriented electrical steel sheet according to the present embodiment is capable of decreasing the iron loss value. Specifically, in the grain-oriented electrical steel sheet according to the present embodiment, an iron loss Wp in the case of not carrying out a magnetic domain refinement treatment is 0.800 W/kg or less in terms of $W_{17/50}$. The iron loss is preferably 0.790 W/kg or less. The lower limit does not need to be particularly limited, but may be set to 0.600 W/kg from the viewpoint of industrial stable manufacturability.

In the grain-oriented electrical steel sheet according to the present embodiment, Wp/Wd that is the ratio of an iron loss Wp in the case of not carrying out a magnetic domain refinement treatment to an iron loss Wd in the case of carrying out a magnetic domain refinement treatment is 1.15 or less in terms of $W_{17/50}$. Wp/Wd is preferably 1.14 or less. The lower limit does not need to be particularly limited, but may be set to 1.03 from the viewpoint of industrial stable manufacturability.

The grain-oriented electrical steel sheet according to the present embodiment is capable of sufficiently decreasing the iron loss even without carrying out a magnetic domain refinement. Therefore, the grain-oriented electrical steel sheet according to the present embodiment is capable of satisfying both the magnetic characteristics of a transformer and noise characteristics.

As the iron loss Wp in the case of not carrying out a magnetic domain refinement treatment, a value measured from the grain-oriented electrical steel sheet after stress relief annealing is used. As the iron loss Wd in the case of carrying out the magnetic domain refinement treatment, the lowest iron loss value of the grain-oriented electrical steel sheet on which the magnetic domain refinement treatment has been carried out such that the iron loss is saturated is used. The lowest iron loss value can be obtained by, for example, setting an irradiation interval P in the longitudinal direction of the steel sheet to 4 mm, setting a laser irradiation direction to be perpendicular to the longitudinal direction of the steel sheet, and measuring iron losses of a specimen irradiated with a laser while changing an irradiation energy density Ua at intervals of 0.2 mmJ/mm². $W_{17/50}$ refers to the average value of iron losses obtained by exciting five or more samples collected from the grain-oriented electrical steel sheet to 1.7 T at 50 Hz.

According to the manufacturing method according to the present embodiment, it is possible to manufacture a grain-oriented electrical steel sheet having an iron loss sufficiently decreased even without carrying out a magnetic domain refinement treatment. When the grain-oriented electrical steel sheet according to the present embodiment is used as a core material for a transformer, it is possible to improve both the magnetic characteristics of the transformer and noise characteristics.

It is needless to say that, in the present embodiment, a magnetic domain refinement treatment may be carried out on the grain-oriented electrical steel sheet depending on customers' purposes. However, in the grain-oriented electrical steel sheet according to the present embodiment, the iron loss value does not significantly decrease before and after the magnetic domain refinement treatment, and it is assumed that the magnetic domain refinement treatment may increase the noise of a transformer.

EXAMPLES

Example 1

A steel ingot containing, by mass %, C: 0.08%, Si: 3.3%, Mn: 0.08%, S: 0.024%, acid-soluble Al: 0.03%, and N: 0.008% with a remainder including Fe and impurities was produced. The steel ingot was heated at 1,350° C. for one hour and then hot-rolled, thereby obtaining a hot-rolled steel sheet having a sheet thickness of 2.3 mm. The obtained hot-rolled steel sheet was subjected to hot-rolled sheet annealing in which the hot-rolled steel sheet was annealed at a peak temperature of 1,100° C. for 140 seconds, pickled such that the amount of the sheet thickness decrease reached 50 m, and then cold-rolled, thereby obtaining a cold-rolled steel sheet having a sheet thickness of 0.23 mm.

Subsequently, primary recrystallization annealing in which the temperature of the obtained cold-rolled steel sheet was rapidly increased at an average temperature increase velocity Va (° C./s) shown in Table 1A in an atmosphere containing 1 vol % of hydrogen and 99 vol % of nitrogen and having a dew point temperature of −20° C. and then decarburization annealing was carried out at 850° C. for 180 seconds in a wet hydrogen-nitrogen atmosphere was carried out. As the average temperature increase velocity Va (° C./s), the average value of temperature increase velocities in a temperature range of 550° C. to 700° C. was used, and, between rapid temperature increases for primary recrystallization annealing, a steel sheet tensile force Sa (N/mm²) shown in Table 1A was imparted in the sheet travelling direction of the cold-rolled steel sheet.

Next, the annealing separating agent including MgO was applied to the surface of the cold-rolled steel sheet after primary recrystallization annealing, then, final annealing was carried out to obtain a final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out under conditions shown in Table 1A, thereby obtaining a grain-oriented electrical steel sheet having a sheet thickness of 0.15 mm or more and 0.23 mm or less. Here, in the flattening annealing, in each of the invention examples and the comparative examples, a temperature Af (° C.) to be reached in the flattening annealing, a holding time Tf (s) at 800° C. or higher, and a steel sheet tensile force Cf (N/mm²) were each controlled.

Five samples were collected from the grain-oriented electrical steel sheet obtained using the above-described method by shearing, stress relief annealing was carried out on these samples, and then the magnetic flux density B8 value and the iron loss Wp were measured on the basis of a single sheet magnetic characteristic testing method described in JIS C 2556:2015. As the iron loss Wp, the average value of iron losses measured in term of $W_{17/50}$ by exciting the five samples to 1.7 T at 50 Hz was used. As the magnetic flux density B8 value, the average value of the magnetic flux densities obtained by imparting a magnetic field of 800 A/m at 50 Hz to the five samples was used.

Furthermore, a magnetic domain refinement treatment was carried out on the specimen, and the iron loss Wd in the case of carrying out a magnetic domain refinement treatment was measured in terms of $W_{17/50}$ on the basis of the single sheet magnetic characteristic testing method described in JIS C 2556:2015. The magnetic domain refinement treatment was carried out by laser irradiation. The direction of laser irradiation was set to a direction perpendicular to the longitudinal direction of the grain-oriented electrical steel sheet, and an interval P of the laser irradiation was set to 4 mm. In addition, an irradiation energy density Ua of a laser was set to 1.5 mJ/mm². The irradiation energy density Ua is a condition under which $W_{17/50}$ of a specimen has been confirmed to be saturated in a previous test. As the iron loss Wd as well, the average value of five samples was used.

From the obtained grain-oriented electrical steel sheet, the insulating coating and the forsterite coating were removed using the above-described method, and then the component composition of the silicon steel sheet was measured using ICP-AES. The amount of C was measured using an inert gas melting-thermal conductivity method. Furthermore, secondary recrystallized grains in the silicon steel sheet were measured using the above-described method.

In a case where the magnetic flux density B8 value was 1.930 T or more, the iron loss Wp was 0.800 or less, and Wp/Wd was 1.03 or more and 1.15 or less, the grain-oriented electrical steel sheet was determined as pass. In the case of failing to satisfy any one of these conditions, the grain-oriented electrical steel sheet was determined as fail and expressed as "C" in the evaluation column in tables. In addition, grain-oriented electrical steel sheets having a shape that was not sufficiently flattened were regarded as unavailable as the grain-oriented electrical steel sheet and determined as fail, the magnetic flux density B8 value and the like were not measured, and "C (shape)" was given to the evaluation column. The iron losses Wp of examples determined as pass were evaluated on the basis of the following standards.

S (Extremely favorable): The iron loss Wp is 0.785 W/kg or less.

A (More favorable): The iron loss Wp is more than 0.785 W/kg and 0.790 W/kg or less B (Favorable): The iron loss Wp is more than 0.790 W/kg and 0.800 W/kg or less The manufacturing conditions, measurement results, and evaluation results of the grain-oriented electrical steel sheets are shown in Table 1A and Table 1B. For invention examples, in the component composition of the silicon steel sheet, the total amount of S and Se was 0.005% or less, the amount of acid-soluble Al was 0.01% or less, the amount of N was 0.005% or less, and the remainder was Fe and impurities.

TABLE 1A

| | Rapid temperature increase for primary recrystallization annealing | | Flattening annealing | | |
|---|---|---|---|---|---|
| Condition | Temperature increase velocity Va (° C./s) | Steel sheet tensile force Sf (N/mm²) | Achieving temperature Af (° C.) | Holding time Tf (s) | Steel sheet tensile force CF (N/mm²) |
| A1 | 100 | 7.84 | 850 | 40 | 9.80 |
| A2 | 400 | 7.84 | 850 | 40 | 9.80 |
| A3 | 700 | 7.84 | 850 | 40 | 9.80 |
| A4 | 1000 | 7.84 | 850 | 40 | 9.80 |
| A5 | 1500 | 7.84 | 850 | 40 | 9.80 |
| A6 | 2500 | 7.84 | 850 | 40 | 9.80 |
| A7 | 700 | 7.84 | 750 | 40 | 9.80 |
| A8 | 700 | 7.84 | 800 | 40 | 9.80 |
| A9 | 700 | 7.84 | 900 | 40 | 9.80 |
| A10 | 700 | 7.84 | 950 | 40 | 9.80 |
| A11 | 700 | 7.84 | 1000 | 40 | 9.80 |
| A12 | 1000 | 7.84 | 850 | 5 | 9.80 |
| A13 | 1000 | 7.84 | 850 | 10 | 9.80 |
| A14 | 1000 | 7.84 | 850 | 100 | 9.80 |
| A15 | 1000 | 7.84 | 850 | 150 | 9.80 |
| A16 | 1000 | 7.84 | 850 | 40 | 1.96 |
| A17 | 1000 | 7.84 | 850 | 40 | 3.92 |
| A18 | 1000 | 7.84 | 850 | 40 | 7.84 |
| A19 | 1000 | 7.84 | 850 | 40 | 11.8 |
| A20 | 1000 | 7.84 | 850 | 40 | 15.7 |
| A21 | 400 | 1.96 | 850 | 40 | 9.80 |
| A22 | 400 | 11.8 | 850 | 40 | 9.80 |
| A23 | 400 | 15.9 | 850 | 40 | 9.80 |
| A24 | 400 | 20.0 | 850 | 40 | 9.80 |
| A25 | 400 | 23.5 | 850 | 40 | 9.80 |
| A26 | 700 | 1.96 | 850 | 40 | 9.80 |
| A27 | 700 | 11.8 | 850 | 40 | 9.80 |
| A28 | 700 | 15.9 | 850 | 40 | 9.80 |
| A29 | 700 | 20.0 | 850 | 40 | 9.80 |
| A30 | 700 | 23.5 | 850 | 40 | 9.80 |
| A31 | 1000 | 1.96 | 850 | 40 | 9.80 |
| A32 | 1000 | 11.8 | 850 | 40 | 9.80 |
| A33 | 1000 | 15.9 | 850 | 40 | 9.80 |
| A34 | 1000 | 20.0 | 850 | 40 | 9.80 |
| A35 | 1000 | 23.5 | 850 | 40 | 9.80 |
| A36 | 1500 | 1.96 | 850 | 40 | 9.80 |
| A37 | 1500 | 11.8 | 850 | 40 | 9.80 |
| A38 | 1500 | 15.9 | 850 | 40 | 9.80 |
| A39 | 1500 | 20.0 | 850 | 40 | 9.80 |
| A40 | 1500 | 23.5 | 850 | 40 | 9.80 |
| A41 | 2500 | 1.96 | 850 | 40 | 9.80 |
| A42 | 2500 | 11.8 | 850 | 40 | 9.80 |
| A43 | 2500 | 15.9 | 850 | 40 | 9.80 |
| A44 | 2500 | 20.0 | 850 | 40 | 9.80 |
| A45 | 2500 | 23.5 | 850 | 40 | 9.80 |

TABLE 1B

| | | Iron loss before magnetic domain refinement Wp (W/kg) | Iron loss after magnetic domain refinement Wd (W/kg) | | Silicon steel sheet | | | | | |
| | Magnetic flux density B8 value | | | | Average grain size of secondary recrystallized | Si | Mn | C | | |
| Condition | (T) | | | Wp/Wd | grains (mm) | (%) | (%) | (%) | Evaluation | Note |
|---|---|---|---|---|---|---|---|---|---|---|
| A1 | 1.934 | 0.844 | 0.700 | 1.21 | 55 | 3.2 | 0.08 | 0.0016 | C | Comparative Example |
| A2 | 1.934 | 0.797 | 0.699 | 1.14 | 44 | 3.2 | 0.08 | 0.0017 | B | Invention Example |
| A3 | 1.934 | 0.789 | 0.699 | 1.13 | 35 | 3.2 | 0.08 | 0.0018 | A | Invention Example |
| A4 | 1.935 | 0.785 | 0.698 | 1.12 | 27 | 3.2 | 0.08 | 0.0017 | S | Invention Example |
| A5 | 1.936 | 0.784 | 0.695 | 1.13 | 25 | 3.2 | 0.08 | 0.0016 | S | Invention Example |
| A6 | 1.936 | 0.777 | 0.694 | 1.12 | 22 | 3.2 | 0.08 | 0.0017 | S | Invention Example |
| A7 | — | — | — | — | — | — | — | — | C (shape) | Comparative Example |
| A8 | 1.934 | 0.790 | 0.697 | 1.13 | 35 | 3.2 | 0.08 | 0.0016 | A | Invention Example |
| A9 | 1.934 | 0.788 | 0.700 | 1.13 | 35 | 3.2 | 0.08 | 0.0018 | A | Invention Example |
| A10 | 1.934 | 0.790 | 0.703 | 1.12 | 34 | 3.2 | 0.08 | 0.0017 | A | Invention Example |
| A11 | 1.928 | 0.805 | 0.724 | 1.11 | 35 | 3.2 | 0.08 | 0.0018 | C | Comparative Example |
| A12 | — | — | — | — | — | — | — | — | C (shape) | Comparative Example |
| A13 | 1.935 | 0.785 | 0.697 | 1.13 | 26 | 3.2 | 0.08 | 0.0016 | S | Invention Example |
| A14 | 1.935 | 0.784 | 0.695 | 1.13 | 27 | 3.2 | 0.08 | 0.0017 | S | Invention Example |
| A15 | 1.928 | 0.808 | 0.731 | 1.11 | 27 | 3.2 | 0.08 | 0.0018 | C | Comparative Example |
| A16 | — | — | — | — | — | — | — | — | C (shape) | Comparative Example |
| A17 | 1.935 | 0.785 | 0.699 | 1.12 | 27 | 3.2 | 0.08 | 0.0017 | S | Invention Example |
| A18 | 1.935 | 0.784 | 0.697 | 1.12 | 27 | 3.2 | 0.08 | 0.0016 | S | Invention Example |
| A19 | 1.935 | 0.785 | 0.709 | 1.11 | 27 | 3.2 | 0.08 | 0.0017 | S | Invention Example |
| A20 | 1.929 | 0.805 | 0.750 | 1.07 | 27 | 3.2 | 0.08 | 0.0016 | C | Comparative Example |
| A21 | 1.934 | 0.800 | 0.698 | 1.15 | 46 | 3.2 | 0.08 | 0.0018 | B | Invention Example |
| A22 | 1.934 | 0.798 | 0.700 | 1.14 | 43 | 3.2 | 0.08 | 0.0018 | B | Invention Example |
| A23 | 1.934 | 0.799 | 0.703 | 1.14 | 42 | 3.2 | 0.08 | 0.0016 | B | Invention Example |
| A24 | 1.933 | 0.799 | 0.707 | 1.13 | 41 | 3.2 | 0.08 | 0.0019 | B | Invention Example |
| A25 | 1.929 | 0.810 | 0.711 | 1.14 | 35 | 3.2 | 0.08 | 0.0022 | C | Comparative Example |
| A26 | 1.934 | 0.788 | 0.699 | 1.13 | 36 | 3.2 | 0.08 | 0.0016 | A | Invention Example |
| A27 | 1.934 | 0.788 | 0.700 | 1.13 | 33 | 3.2 | 0.08 | 0.0018 | A | Invention Example |
| A28 | 1.932 | 0.789 | 0.704 | 1.12 | 32 | 3.2 | 0.08 | 0.0019 | A | Invention Example |
| A29 | 1.929 | 0.808 | 0.713 | 1.13 | 29 | 3.2 | 0.08 | 0.0019 | C | Comparative Example |
| A30 | 1.924 | 0.829 | 0.726 | 1.14 | 25 | 3.2 | 0.08 | 0.0023 | C | Comparative Example |
| A31 | 1.936 | 0.783 | 0.695 | 1.13 | 28 | 3.2 | 0.08 | 0.0017 | S | Invention Example |
| A32 | 1.936 | 0.784 | 0.695 | 1.13 | 26 | 3.2 | 0.08 | 0.0018 | S | Invention Example |
| A33 | 1.928 | 0.811 | 0.714 | 1.14 | 23 | 3.2 | 0.06 | 0.0018 | C | Comparative Example |
| A34 | 1.922 | 0.833 | 0.729 | 1.14 | 22 | 3.2 | 0.08 | 0.0019 | C | Comparative Example |
| A35 | 1.919 | 0.860 | 0.752 | 1.14 | 20 | 3.2 | 0.08 | 0.0023 | C | Comparative Example |

TABLE 1B-continued

| | | | | Silicon steel sheet | | | | | |
|---|---|---|---|---|---|---|---|---|---|
| Condition | Magnetic flux density B8 value (T) | Iron loss before magnetic domain refinement Wp (W/kg) | Iron loss after magnetic domain refinement Wd (W/kg) | Wp/Wd | Average grain size of secondary recrystallized grains (mm) | Si (%) | Mn (%) | C (%) | Evaluation Note |
| A36 | 1.936 | 0.784 | 0.695 | 1.13 | 25 | 3.2 | 0.08 | 0.0018 | S Invention Example |
| A37 | 1.936 | 0.784 | 0.695 | 1.13 | 24 | 3.2 | 0.08 | 0.0017 | S Invention Example |
| A38 | 1.927 | 0.814 | 0.718 | 1.13 | 21 | 3.2 | 0.08 | 0.0018 | C Comparative Example |
| A39 | 1.921 | 0.837 | 0.733 | 1.14 | 20 | 3.2 | 0.08 | 0.0019 | C Comparative Example |
| A40 | 1.918 | 0.869 | 0.763 | 1.14 | 19 | 3.2 | 0.08 | 0.0025 | C Comparative Example |
| A41 | 1.936 | 0.776 | 0.694 | 1.12 | 22 | 3.2 | 0.08 | 0.0018 | S Invention Example |
| A42 | 1.936 | 0.778 | 0.694 | 1.12 | 21 | 3.2 | 0.08 | 0.0019 | S Invention Example |
| A43 | 1.926 | 0.818 | 0.720 | 1.14 | 18 | 3.2 | 0.08 | 0.0017 | C Comparative Example |
| A44 | 1.920 | 0.840 | 0.735 | 1.14 | 17 | 3.2 | 0.08 | 0.0018 | C Comparative Example |
| A45 | 1.917 | 0.876 | 0.771 | 1.14 | 15 | 3.2 | 0.08 | 0.0028 | C Comparative Example |

As shown in Table 1B, it was found that the grain-oriented electrical steel sheets satisfying the conditions of the present embodiment (invention examples) were evaluated as B (favorable) or higher. In addition, in invention examples in which the average temperature increase velocity Va in 550° C. to 700° C. in the primary recrystallization annealing was 700° C./s or more, it was found that the iron loss Wp reached 0.790 W/kg or less, and thus the evaluation was A or higher (more favorable or higher). Furthermore, in invention examples in which the average temperature increase velocity Va in 550° C. to 700° C. in the primary recrystallization annealing was 1,000° C./s or more, it was found that the iron loss Wp reached 0.785 W/kg or less, and thus the evaluation was S (extremely favorable).

Here, a graph obtained by indicating the average temperature increase velocity Va along the horizontal axis, indicating the steel sheet tensile force Sa along the vertical axis, and plotting the results shown in Table 1A and Table 1B is shown in FIG. 1. When the invention examples are plotted as round signs, and comparative examples are plotted as multiplication signs as shown in FIG. 1, it is found that the average temperature increase velocity Va (° C./s) in the rapid temperature increase for primary recrystallization annealing and the steel sheet tensile force Sa (N/mm²) have the relationships of Expression 1 and Expression 2 regulated by the conditions according to the present embodiment. In FIG. 1, a condition A1 in which the average temperature increase velocity Va in 550° C. to 700° C. in the primary recrystallization annealing failed to satisfy the condition according to the present embodiment is not plotted.

$$1.96 \leq Sa \leq (25.5 - 0.0137 \times Va)(Va \leq 1000) \quad \text{Expression 1}$$

$$1.96 \leq Sa \leq 11.8 (Va > 1000) \quad \text{Expression 2}$$

Example 2

A steel ingot containing, by mass %, C: 0.08%, Si: 3.2%, Mn: 0.08%, S: 0.025%, acid-soluble Al: 0.03%, and N: 0.008% with a remainder including Fe and impurities was produced. The steel ingot was heated at 1,350° C. for one hour and then hot-rolled, thereby obtaining a hot-rolled steel sheet having a sheet thickness of 2.3 mm. The obtained hot-rolled steel sheet was subjected to hot-rolled sheet annealing in which the hot-rolled steel sheet was annealed at a peak temperature of 1,100° C. for 140 seconds, pickled so as to obtain an amount of the sheet thickness decreased as shown in Table 2A, and then cold-rolled, thereby obtaining a cold-rolled steel sheet having a sheet thickness of 0.23 mm.

Subsequently, the temperature of the obtained cold-rolled steel sheet was rapidly increased at an average temperature increase velocity Va (° C./s) shown in Table 2A in an atmosphere containing 2 vol % of hydrogen and 98 vol % of nitrogen and having a dew point temperature shown in Table 2A and then primary recrystallization annealing was carried out at 850° C. for 180 seconds in a wet hydrogen-nitrogen atmosphere. During the rapid temperature increase for the primary recrystallization annealing, a steel sheet tensile force Sa (N/mm²) shown in Table 2A was imparted in the sheet travelling direction of the cold-rolled steel sheet.

Next, the annealing separating agent including MgO was applied to the surface of the cold-rolled steel sheet after primary recrystallization annealing, then, final annealing was carried out to obtain a final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out, thereby obtaining a grain-oriented electrical steel sheet having a sheet thickness of 0.15 mm or more and 0.23 mm or less. Here, the temperature Af to be reached for the flattening annealing was set to 850° C., the holding time Tf at 800° C. or higher was set to 40 seconds, and the steel sheet tensile force Cf was set to 9.8 N/mm.

For the grain-oriented electrical steel sheet obtained using the above-described method, the magnetic flux density B8 value, the iron losses Wp and Wd, the component composition of the silicon steel sheet, and the average grain size of secondary recrystallized grains were measured using the same methods as in Example 1.

In a case where the magnetic flux density B8 value was 1.930 T or more, the iron loss Wp was 0.800 or less, and Wp/Wd was 1.03 or more and 1.15 or less, the grain-oriented electrical steel sheet was determined as pass. In the case of failing to satisfy any one of these conditions, the grain-oriented electrical steel sheet was determined as fail and expressed as "C" in the evaluation column in tables. Under Condition B1, the amount of the sheet thickness decreased during the pickling was small, an oxide (scale) formed on the surface of the steel sheet was not sufficiently removed, and a rolling roll was worn during the cold rolling carried out after the pickling, and thus the cold rolling was stopped, and thus "C (roll worn)" was given to the evaluation column. In addition, the iron losses Wp of examples determined as pass were evaluated as S (extremely favorable), A (more favorable), or B (favorable) on the basis of the same standards as in Example 1.

The manufacturing conditions, measurement results, and evaluation results of the grain-oriented electrical steel sheets are shown in Table 2A and Table 2B. For invention examples, in the component composition of the silicon steel sheet, the total amount of S and Se was 0.005% or less, the amount of acid-soluble Al was 0.01% or less, the amount of N was 0.005% or less, and the remainder was Fe and impurities.

TABLE 2A

| Condition | Amount of sheet thickness decreased during pickling (μm) | Rapid temperature increase for primary recrystallization annealing | | |
|---|---|---|---|---|
| | | Dew point temperature of atmosphere (°C.) | Temperature increase velocity Va (°C./s) | Steel sheet tensile force Sa (N/mm$^2$) |
| B1 | 2 | Rolling impossible | — | — |
| B2 | 5 | −30 | 1000 | 7.8 |
| B3 | 10 | −30 | 1000 | 7.8 |
| B4 | 50 | −30 | 1000 | 7.8 |
| B5 | 100 | −30 | 1000 | 7.8 |
| B6 | 150 | −30 | 1000 | 7.8 |
| B7 | 200 | −30 | 1000 | 7.8 |
| B8 | 5 | −15 | 1000 | 7.8 |
| B9 | 10 | −15 | 1000 | 7.8 |
| B10 | 50 | −15 | 1000 | 7.8 |
| B11 | 100 | −15 | 1000 | 7.8 |
| B12 | 150 | −15 | 1000 | 7.8 |
| B13 | 200 | −15 | 1000 | 7.8 |
| B14 | 5 | 0 | 1000 | 7.8 |
| B15 | 10 | 0 | 1000 | 7.8 |
| B16 | 50 | 0 | 1000 | 7.8 |
| B17 | 100 | 0 | 1000 | 7.8 |
| B18 | 150 | 0 | 1000 | 7.8 |
| B19 | 200 | 0 | 1000 | 7.8 |
| B20 | 5 | 10 | 1000 | 7.8 |
| B21 | 10 | 10 | 1000 | 7.8 |
| B22 | 50 | 10 | 1000 | 7.8 |
| B23 | 100 | 10 | 1000 | 7.8 |
| B24 | 150 | 10 | 1000 | 7.8 |
| B25 | 200 | 10 | 1000 | 7.8 |
| B26 | 150 | 10 | 100 | 7.8 |
| B27 | 150 | 10 | 400 | 7.8 |
| B28 | 150 | 10 | 700 | 7.8 |
| B29 | 150 | 10 | 1500 | 7.8 |
| B30 | 150 | 10 | 2500 | 7.8 |
| B31 | 200 | 0 | 100 | 7.8 |
| B32 | 200 | 0 | 400 | 7.8 |
| B33 | 200 | 0 | 700 | 7.8 |
| B34 | 200 | 0 | 1500 | 7.8 |
| B35 | 200 | 0 | 2500 | 7.8 |
| B36 | 150 | 0 | 100 | 7.8 |
| B37 | 150 | 0 | 400 | 7.8 |
| B38 | 150 | 0 | 700 | 7.8 |
| B39 | 150 | 0 | 1500 | 7.8 |
| B40 | 150 | 0 | 2500 | 7.8 |
| B41 | 150 | 0 | 1000 | 1.96 |
| B42 | 150 | 0 | 1000 | 11.8 |
| B43 | 150 | 0 | 1000 | 15.9 |

TABLE 2B

| | | | | Silicon steel sheet | | | | | |
|---|---|---|---|---|---|---|---|---|---|
| Condition | Magnetic flux density B8 value (T) | Iron loss before magnetic domain refinement Wp (W/kg) | Iron loss after magnetic domain refinement Wd (W/kg) | Wp/Wd | Average grain size of secondary recrystallized grains (mm) | Si (%) | Mb (%) | C (%) | Evaluation | Note |
| B1 | — | — | — | — | — | — | — | — | C (roll worn) | Comparative Example |
| B2 | 1.934 | 0.783 | 0.697 | 1.12 | 27 | 3.1 | 0.08 | 0.0016 | S | Invention Example |
| B3 | 1.934 | 0.783 | 0.697 | 1.12 | 27 | 3.1 | 0.08 | 0.0016 | S | Invention Example |
| B4 | 1.934 | 0.784 | 0.697 | 1.12 | 27 | 3.1 | 0.08 | 0.0018 | S | Invention Example |
| B5 | 1.935 | 0.784 | 0.698 | 1.12 | 27 | 3.2 | 0.08 | 0.0022 | S | Invention Example |
| B6 | 1.934 | 0.785 | 0.699 | 1.12 | 26 | 3.2 | 0.08 | 0.0031 | S | Invention Example |
| B7 | 1.933 | 0.852 | 0.781 | 1.09 | 25 | 3.2 | 0.08 | 0.0034 | C | Comparative Example |
| B8 | 1.935 | 0.784 | 0.698 | 1.12 | 27 | 3.1 | 0.08 | 0.0016 | S | Invention Example |
| B9 | 1.934 | 0.785 | 0.699 | 1.12 | 27 | 3.1 | 0.08 | 0.0017 | S | Invention Example |
| B10 | 1.935 | 0.784 | 0.699 | 1.12 | 27 | 3.2 | 0.08 | 0.0018 | S | Invention Example |
| B11 | 1.934 | 0.784 | 0.699 | 1.12 | 27 | 3.2 | 0.08 | 0.0025 | S | Invention Example |
| B12 | 1.934 | 0.785 | 0.700 | 1.12 | 27 | 3.2 | 0.08 | 0.0034 | S | Invention Example |
| B13 | 1.935 | 0.873 | 0.804 | 1.09 | 27 | 3.2 | 0.08 | 0.0058 | C | Comparative Example |
| B14 | 1.934 | 0.785 | 0.698 | 1.12 | 27 | 3.1 | 0.08 | 0.0017 | S | Invention Example |
| B15 | 1.934 | 0.784 | 0.699 | 1.12 | 27 | 3.1 | 0.08 | 0.0018 | S | Invention Example |
| B16 | 1.935 | 0.785 | 0.699 | 1.12 | 27 | 3.2 | 0.08 | 0.0019 | S | Invention Example |
| B17 | 1.935 | 0.785 | 0.698 | 1.12 | 27 | 3.2 | 0.08 | 0.0029 | S | Invention Example |
| B18 | 1.934 | 0.785 | 0.700 | 1.12 | 27 | 3.2 | 0.08 | 0.0037 | S | Invention Example |
| B19 | 1.933 | 0.883 | 0.809 | 1.09 | 25 | 3.2 | 0.08 | 0.0065 | C | Comparative Example |
| B20 | 1.933 | 0.875 | 0.806 | 1.09 | 26 | 3.1 | 0.08 | 0.0058 | C | Comparative Example |
| B21 | 1.933 | 0.877 | 0.807 | 1.09 | 26 | 3.1 | 0.08 | 0.0062 | C | Comparative Example |
| B22 | 1.933 | 0.880 | 0.809 | 1.09 | 25 | 3.2 | 0.08 | 0.0064 | C | Comparative Example |
| B23 | 1.932 | 0.885 | 0.812 | 1.09 | 25 | 3.2 | 0.08 | 0.0067 | C | Comparative Example |
| B24 | 1.932 | 0.887 | 0.815 | 1.09 | 24 | 3.2 | 0.08 | 0.0071 | C | Comparative Example |
| B25 | 1.932 | 0.951 | 0.869 | 1.09 | 21 | 3.2 | 0.08 | 0.0128 | C | Comparative Example |
| B26 | 1.933 | 0.852 | 0.717 | 1.19 | 52 | 3.2 | 0.08 | 0.0045 | C | Comparative Example |
| B27 | 1.933 | 0.899 | 0.822 | 1.09 | 42 | 3.2 | 0.08 | 0.0059 | C | Comparative Example |
| B28 | 1.934 | 0.891 | 0.817 | 1.09 | 32 | 3.2 | 0.08 | 0.0062 | C | Comparative Example |
| B29 | 1.934 | 0.883 | 0.808 | 1.09 | 21 | 3.2 | 0.08 | 0.0064 | C | Comparative Example |
| B30 | 1.935 | 0.872 | 0.804 | 1.08 | 18 | 3.2 | 0.08 | 0.0069 | C | Comparative Example |
| B31 | 1.933 | 0.848 | 0.720 | 1.18 | 53 | 3.2 | 0.08 | 0.0047 | C | Comparative Example |
| B32 | 1.933 | 0.897 | 0.816 | 1.10 | 42 | 3.2 | 0.08 | 0.0062 | C | Comparative Example |
| B33 | 1.934 | 0.885 | 0.812 | 1.09 | 33 | 3.2 | 0.08 | 0.0064 | C | Comparative Example |
| B34 | 1.935 | 0.882 | 0.806 | 1.09 | 22 | 3.2 | 0.08 | 0.0068 | C | Comparative Example |
| B35 | 1.935 | 0.871 | 0.803 | 1.08 | 19 | 3.2 | 0.08 | 0.0070 | C | Comparative Example |

TABLE 2B-continued

| | | Silicon steel sheet | | | | | | | | |
|---|---|---|---|---|---|---|---|---|---|---|
| Condition | Magnetic flux density B8 value (T) | Iron loss before magnetic domain refinement Wp (W/kg) | Iron loss after magnetic domain refinement Wd (W/kg) | Wp/Wd | Average grain size of secondary recrystallized grains (mm) | Si (%) | Mb (%) | C (%) | Evaluation | Note |
| B36 | 1.934 | 0.848 | 0.700 | 1.21 | 54 | 3.2 | 0.08 | 0.0031 | C | Comparative Example |
| B37 | 1.934 | 0.798 | 0.700 | 1.14 | 43 | 3.2 | 0.08 | 0.0034 | B | Invention Example |
| B38 | 1.934 | 0.790 | 0.699 | 1.13 | 34 | 3.2 | 0.08 | 0.0036 | A | Invention Example |
| B39 | 1.936 | 0.782 | 0.697 | 1.12 | 24 | 3.2 | 0.08 | 0.0038 | S | Invention Example |
| B40 | 1.936 | 0.779 | 0.696 | 1.12 | 20 | 3.2 | 0.08 | 0.0040 | S | Invention Example |
| B41 | 1.936 | 0.785 | 0.696 | 1.13 | 27 | 3.2 | 0.08 | 0.0038 | S | Invention Example |
| B42 | 1.934 | 0.784 | 0.695 | 1.13 | 25 | 3.2 | 0.08 | 0.0036 | S | Invention Example |
| B43 | 1.927 | 0.814 | 0.718 | 1.13 | 22 | 3.2 | 0.08 | 0.0037 | C | Comparative Example |

As shown in Table 2B, it was found that the grain-oriented electrical steel sheets satisfying the conditions of the present embodiment (invention examples) were evaluated as B (favorable) or higher. In addition, in invention examples in which the average temperature increase velocity Va in 550° C. to 700° C. in the primary recrystallization annealing was 700° C./s or more, it was found that the iron loss Wp reached 0.790 W/kg or less, and thus the evaluation was A or higher (more favorable or higher). Furthermore, in invention examples in which the average temperature increase velocity Va in 550° C. to 700° C. in the primary recrystallization annealing was 1000° C./s or more, it was found that the iron loss Wp reached 0.785 W/kg or less, and thus the evaluation was S (extremely favorable or higher).

Example 3

A steel ingot containing, by mass %, C: 0.08%, Si: 3.2%, Mn: 0.08%, S: 0.005%, Se: 0.019%, acid-soluble Al: 0.03%, and N: 0.008% with a remainder including components shown in Table 3A, Fe, and impurities was produced. The steel ingot was heated at 1,350° C. for one hour and then hot-rolled, thereby obtaining a hot-rolled steel sheet having a sheet thickness of 2.3 mm. The obtained hot-rolled steel sheet was subjected to hot-rolled sheet annealing in which the hot-rolled steel sheet was annealed at a peak temperature of 1,100° C. for 140 seconds, pickled such that the amount of the sheet thickness decreased reached 10 µm, and then cold-rolled, thereby obtaining a cold-rolled steel sheet having a sheet thickness of 0.23 mm.

Subsequently, the temperature of the obtained cold-rolled steel sheet was rapidly increased in an atmosphere containing 1 vol % of hydrogen and 99 vol % of nitrogen and having a dew point temperature of −30° C. such that the average temperature increase velocity Va in 550° C. to 700° C. reached 1000° C./s, and then primary recrystallization annealing was carried out at 850° C. for 180 seconds in a wet hydrogen-nitrogen atmosphere. During the rapid temperature increase for the primary recrystallization annealing, a steel sheet tensile force Sa of 7.84 N/mm² was imparted in the sheet travelling direction of the cold-rolled steel sheet.

Next, the annealing separating agent including MgO was applied to the surface of the cold-rolled steel sheet after primary recrystallization annealing, then, final annealing was carried out to obtain a final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out, thereby obtaining a grain-oriented electrical steel sheet having a sheet thickness of 0.15 mm or more and 0.23 mm or less. Here, the temperature Af to be reached for the flattening annealing was set to 850° C., the holding time Tf at 800° C. or higher was set to 40 seconds, and the steel sheet tensile force Cf was set to 9.8 N/mm².

For the grain-oriented electrical steel sheet obtained using the above-described method, the magnetic flux density B8 value, the iron losses Wp and Wd, the component composition of the silicon steel sheet, and the average grain size of secondary recrystallized grains were measured using the same methods as in Example 1.

In a case where the magnetic flux density B8 value was 1.930 T or more, the iron loss Wp was 0.800 or less, and Wp/Wd was 1.03 or more and 1.15 or less, the grain-oriented electrical steel sheet was determined as pass. In addition, the iron losses Wp of examples determined as pass were evaluated as S (extremely favorable), A (more favorable), or B (favorable) on the basis of the same standards as in Example 1.

The measurement results and evaluation results obtained using the above-described methods are shown in Table 3A and Table 3B. For invention examples, in the component composition of the silicon steel sheet, the total amount of S and Se was 0.005% or less, the amount of acid-soluble Al was 0.01% or less, the amount of N was 0.005% or less, and the remainder was Fe and impurities.

TABLE 3A

| Condition | Remainder component of steel ingot | | | | |
|---|---|---|---|---|---|
| | Cu (%) | Su (%) | Ni (%) | Cr (%) | Sb (%) |
| C1 | <0.01 | <0.01 | <0.01 | <0.01 | <0.01 |
| C2 | 0.01 | <0.01 | <0.01 | <0.01 | <0.01 |
| C3 | 0.10 | <0.01 | <0.01 | <0.01 | <0.01 |
| C4 | 0.30 | <0.01 | <0.01 | <0.01 | <0.01 |
| C5 | <0.01 | 0.01 | <0.01 | <0.01 | <0.01 |
| C6 | <0.01 | 0.10 | <0.01 | <0.01 | <0.01 |
| C7 | <0.01 | 0.30 | <0.01 | <0.01 | <0.01 |
| C8 | <0.01 | <0.01 | 0.01 | <0.01 | <0.01 |
| C9 | <0.01 | <0.01 | 0.10 | <0.01 | <0.01 |
| C10 | <0.01 | <0.01 | 0.30 | <0.01 | <0.01 |
| C11 | <0.01 | <0.01 | <0.01 | 0.01 | <0.01 |
| C12 | <0.01 | <0.01 | <0.01 | 0.10 | <0.01 |
| C13 | <0.01 | <0.01 | <0.01 | 0.30 | <0.01 |
| C14 | <0.01 | <0.01 | <0.01 | <0.01 | 0.01 |
| C15 | <0.01 | <0.01 | <0.01 | <0.01 | 0.10 |
| C16 | <0.01 | <0.01 | <0.01 | <0.01 | 0.30 |
| C17 | 0.08 | 0.15 | 0.05 | 0.05 | 0.05 |

TABLE 3B

| Condition | Magnetic flux density B8 value (T) | Iron loss before magnetic domain refinement Wp (W/kg) | Iron loss after magnetic domain refinement Wd (W/kg) | Wp/Wd | Silicon steel sheet Average grain size of secondary recrystallized grains (mm) | Si (%) | Mn (%) |
|---|---|---|---|---|---|---|---|
| C1 | 1.935 | 0.785 | 0.699 | 1.12 | 27 | 3.2 | 0.08 |
| C2 | 1.936 | 0.780 | 0.694 | 1.12 | 27 | 3.2 | 0.08 |
| C3 | 1.936 | 0.777 | 0.693 | 1.12 | 27 | 3.2 | 0.08 |
| C4 | 1.936 | 0.779 | 0.694 | 1.12 | 27 | 3.2 | 0.08 |
| C5 | 1.936 | 0.779 | 0.693 | 1.12 | 27 | 3.2 | 0.08 |
| G6 | 1.936 | 0.777 | 0.692 | 1.12 | 27 | 3.2 | 0.08 |
| C7 | 1.936 | 0.778 | 0.692 | 1.12 | 27 | 3.2 | 0.08 |
| C8 | 1.937 | 0.775 | 0.690 | 1.12 | 27 | 3.2 | 0.08 |
| C9 | 1.937 | 0.773 | 0.688 | 1.12 | 27 | 3.2 | 0.08 |
| C10 | 1.937 | 0.773 | 0.688 | 1.12 | 27 | 3.2 | 0.08 |
| C11 | 1.936 | 0.779 | 0.694 | 1.12 | 27 | 3.2 | 0.08 |
| C12 | 1.936 | 0.779 | 0.693 | 1.12 | 27 | 3.2 | 0.08 |
| C13 | 1.936 | 0.780 | 0.693 | 1.13 | 27 | 3.2 | 0.08 |
| C14 | 1.936 | 0.778 | 0.692 | 1.12 | 28 | 3.2 | 0.08 |
| C15 | 1.937 | 0.777 | 0.689 | 1.12 | 28 | 3.2 | 0.08 |
| C16 | 1.937 | 0.777 | 0.687 | 1.14 | 28 | 3.2 | 0.08 |
| C17 | 1.937 | 0.770 | 0.685 | 1.12 | 28 | 3.2 | 0.08 |

| Condition | Silicon steel sheet | | | | | | Evaluation | Note |
|---|---|---|---|---|---|---|---|---|
| | C (%) | Cu (%) | Sn (%) | Ni (%) | Cr (%) | Sb (%) | | |
| C1 | 0.0016 | <0.01 | <0.01 | <0.01 | <0.01 | <0.01 | S | Invention Example |
| C2 | 0.0017 | 0.01 | <0.01 | <0.01 | <0.01 | <0.01 | S | Invention Example |
| C3 | 0.0018 | 0.10 | <0.01 | <0.01 | <0.01 | <0.01 | S | Invention Example |
| C4 | 0.0020 | 0.30 | <0.01 | <0.01 | <0.01 | <0.01 | S | Invention Example |
| C5 | 0.0017 | <0.01 | 0.01 | <0.01 | <0.01 | <0.01 | S | Invention Example |
| G6 | 0.0019 | <0.01 | 0.10 | <0.01 | <0.01 | <0.01 | S | Invention Example |
| C7 | 0.0023 | <0.01 | 0.30 | <0.01 | <0.01 | <0.01 | S | Invention Example |
| C8 | 0.0018 | <0.01 | <0.01 | 0.01 | <0.01 | <0.01 | S | Invention Example |
| C9 | 0.0018 | <0.01 | <0.01 | 0.10 | <0.01 | <0.01 | S | Invention Example |
| C10 | 0.0019 | <0.01 | <0.01 | 0.30 | <0.01 | <0.01 | S | Invention Example |
| C11 | 0.0015 | <0.01 | <0.01 | <0.01 | 0.01 | <0.01 | S | Invention Example |
| C12 | 0.0017 | <0.01 | <0.01 | <0.01 | 0.10 | <0.01 | S | Invention Example |
| C13 | 0.0017 | <0.01 | <0.01 | <0.01 | 0.30 | <0.01 | S | Invention Example |
| C14 | 0.0019 | <0.01 | <0.01 | <0.01 | <0.01 | 0.01 | S | Invention Example |

TABLE 3B-continued

| | | | | | | | | |
|---|---|---|---|---|---|---|---|---|
| C15 | 0.0025 | <0.01 | <0.01 | <0.01 | <0.01 | 0.10 | S | Invention Example |
| C16 | 0.0029 | <0.01 | <0.01 | <0.01 | <0.01 | 0.30 | S | Invention Example |
| C17 | 0.0028 | 0.08 | 0.15 | 0.05 | 0.05 | 0.05 | S | Invention Example |

Referring to Table 3B, it was found that the grain-oriented electrical steel sheets having a component composition containing, by mass %, any one or more of Cu: 0.01% or more and 0.30 or less, Sn: 0.01% or more and 0.30% or less, Ni: 0.01% or more and 0.30% or less, Cr: 0.01% or more and 0.30% or less, or Sb: 0.01% or more and 0.30% or less had an iron loss Wp of 0.780 or less and a further decreased iron loss Wp.

Example 4

A steel ingot containing, by mass %, C: 0.08%, S: 0.023%, acid-soluble AL: 0.03%, and N: 0.008% with a remainder including Si and Mn in amounts shown in Table 4, Fe, and impurities was produced. The steel ingot was heated at 1,350° C. for one hour and then hot-rolled, thereby obtaining a hot-rolled steel sheet having a sheet thickness of 2.3 mm. The obtained hot-rolled steel sheet was subjected to hot-rolled sheet annealing in which the hot-rolled steel sheet was annealed at a peak temperature of 1,100° C. for 140 seconds, pickled such that the amount of the sheet thickness decreased reached 20 μm, and then cold-rolled, thereby obtaining a cold-rolled steel sheet having a sheet thickness of 0.23 mm.

Subsequently primary recrystallization annealing in which the temperature of the obtained cold-rolled steel sheet was rapidly increased at an average temperature increase velocity Va (° C./s) shown in Table 4 in a nitrogen atmosphere and an atmosphere having a dew point temperature of −30° C. and then decarburization annealing was carried out at 850° C. for 180 seconds in a wet hydrogen-nitrogen atmosphere was carried out. As the average temperature increase velocity Va (° C./s), the average value of temperature increase velocities from 550° C. to 700 was used, and, between rapid temperature increases for primary recrystallization annealing, a steel sheet tensile force Sa of 7.84 N/mm² was imparted in the sheet travelling direction of the cold-rolled steel sheet.

Next, the annealing separating agent including MgO was applied to the surface of the cold-rolled steel sheet after primary recrystallization annealing, then, final annealing was carried out to obtain a final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out, thereby obtaining a grain-oriented electrical steel sheet having a sheet thickness of 0.15 mm or more and 0.23 mm or less. Here, the temperature Af to be reached for the flattening annealing was set to 850° C., the holding time Tf at 800° C. or higher was set to 40 seconds, and the steel sheet tensile force Cf was set to 9.8 N/mm².

For the grain-oriented electrical steel sheet obtained using the above-described method, the magnetic flux density B8 value, the iron losses Wp and Wd, the component composition of the silicon steel sheet, and the average grain size of secondary recrystallized grains were measured using the same methods as in Example 1.

In a case where the magnetic flux density B8 value was 1.930 T or more, the iron loss Wp was 0.800 or less, and Wp/Wd was 1.03 or more and 1.15 or less, the grain-oriented electrical steel sheet was determined as pass. In the case of failing to satisfy any one of these conditions, the grain-oriented electrical steel sheet was determined as fail and expressed as "C" in the evaluation column in tables. Under Condition D5, the amount of Si in the steel ingot was large, and it was not possible to carry out cold rolling, and thus the grain-oriented electrical steel sheet was determined as fail, the magnetic flux density B8 value and the like were not measured, and "C (rolling impossible)" was given to the evaluation column. In addition, the iron losses Wp of examples determined as pass were evaluated as S (extremely favorable), A (more favorable), or B (favorable) on the basis of the same standards as in Example 1.

The manufacturing conditions, measurement results, and evaluation results of the grain-oriented electrical steel sheets are shown in Table 4. For invention examples, regarding the component composition of the silicon steel sheet, the total amount of S and Se was 0.005% or less, the amount of acid-soluble Al was 0.01% or less, the amount of N was 0.005% or less, and the remainder was Fe and impurities.

TABLE 4

| | Steel ingof component | | Temperature increase velocity during primary recrystallization annealing | Magnetic flux density | Iron loss before magnetic domain refinement | Iron loss after magnetic domain refinement | | Silicon steel sheet | | | | | |
|---|---|---|---|---|---|---|---|---|---|---|---|---|---|
| | | | | | | | | Average grain size of secondary recrystallized grains | | | | | |
| Condition | Si (%) | Mn (%) | Va (° C./s) | B8 value (T) | Wp (W/kg) | Wd (W/kg) | Wp/Wd | (mm) | C (%) | Si (%) | Mn (%) | Evaluation | Note |
| D1 | 2.0 | 0.10 | 1000 | 1.939 | 0.802 | 0.715 | 1.12 | 27 | 0.0018 | 2.0 | 0.10 | C | Comparative Example |
| D2 | 2.5 | 0.10 | 1000 | 1.937 | 0.785 | 0.704 | 1.12 | 27 | 0.0017 | 2.5 | 0.10 | S | Invention Example |

TABLE 4-continued

| Condition | Steel ingot component Si (%) | Steel ingot component Mn (%) | Temperature increase velocity during primary recrystallization annealing Va (° C./s) | Magnetic flux density B8 value (T) | Iron loss before magnetic domain refinement Wp (W/kg) | Iron loss after magnetic domain refinement Wd (W/kg) | Wp/Wd | Silicon steel sheet Average grain size of secondary recrystallized grains (mm) | C (%) | Si (%) | Mn (%) | Evaluation | Note |
|---|---|---|---|---|---|---|---|---|---|---|---|---|---|
| D3 | 3.3 | 0.10 | 1000 | 1.935 | 0.784 | 0.697 | 1.12 | 27 | 0.0018 | 3.2 | 0.10 | S | Invention Example |
| D4 | 4.5 | 0.10 | 1000 | 1.931 | 0.783 | 0.690 | 1.13 | 27 | 0.0019 | 4.5 | 0.10 | S | Invention Example |
| D5 | 5.0 | 0.10 | 1000 | — | — | — | — | — | — | — | — | C (rolling impossible) | Comparative Example |
| D6 | 3.3 | <0.01 | 1000 | 1.867 | 0.933 | 0.905 | 1.03 | 9 | 0.0017 | 3.2 | <0.01 | C | Comparative Example |
| D7 | 3.3 | 0.01 | 1000 | 1.935 | 0.785 | 0.689 | 1.12 | 27 | 0.0018 | 3.3 | 0.01 | S | Invention Example |
| D8 | 3.3 | 0.05 | 1000 | 1.935 | 0.785 | 0.698 | 1.12 | 27 | 0.0018 | 3.3 | 0.05 | S | Invention Example |
| D9 | 3.3 | 0.15 | 1000 | 1.935 | 0.785 | 0.699 | 1.12 | 27 | 0.0017 | 3.3 | 0.15 | S | Invention Example |
| D10 | 3.3 | 0.20 | 1000 | 1.841 | 1.026 | 1.011 | 1.01 | 8 | 0.0019 | 3.3 | 0.20 | C | Comparative Example |
| D11 | 2.5 | 0.10 | 100 | 1.936 | 0.858 | 0.712 | 1.21 | 58 | 0.0017 | 2.5 | 0.10 | C | Comparative Example |
| D12 | 2.5 | 0.10 | 400 | 1.936 | 0.798 | 0.707 | 1.13 | 45 | 0.0018 | 2.5 | 0.10 | B | Invention Example |
| D13 | 2.5 | 0.10 | 700 | 1.936 | 0.789 | 0.705 | 1.12 | 35 | 0.0019 | 2.5 | 0.10 | A | Invention Example |
| D14 | 2.5 | 0.10 | 1500 | 1.938 | 0.784 | 0.699 | 1.12 | 25 | 0.0019 | 2.5 | 0.10 | S | Invention Example |
| D15 | 2.5 | 0.10 | 2500 | 1.938 | 0.779 | 0.698 | 1.12 | 21 | 0.0018 | 2.5 | 0.10 | S | Invention Example |
| D16 | 4.5 | 0.10 | 100 | 1.930 | 0.838 | 0.695 | 1.21 | 54 | 0.0022 | 4.5 | 0.10 | C | Comparative Example |
| D17 | 4.5 | 0.10 | 400 | 1.930 | 0.796 | 0.693 | 1.15 | 42 | 0.0024 | 4.5 | 0.10 | B | Invention Example |
| D18 | 4.5 | 0.10 | 700 | 1.930 | 0.787 | 0.692 | 1.14 | 33 | 0.0026 | 4.5 | 0.10 | A | Invention Example |
| D19 | 4.5 | 0.10 | 1500 | 1.931 | 0.782 | 0.689 | 1.13 | 22 | 0.0028 | 4.5 | 0.10 | S | Invention Example |
| D20 | 4.5 | 0.10 | 2500 | 1.931 | 0.774 | 0.688 | 1.13 | 18 | 0.0030 | 4.5 | 0.10 | S | Invention Example |
| D21 | 3.3 | 0.01 | 100 | 1.933 | 0.861 | 0.712 | 1.21 | 53 | 0.0020 | 3.3 | 0.01 | C | Comparative Example |
| D22 | 3.3 | 0.01 | 400 | 1.933 | 0.799 | 0.703 | 1.14 | 42 | 0.0019 | 3.3 | 0.01 | B | Invention Example |
| D23 | 3.3 | 0.01 | 700 | 1.934 | 0.790 | 0.699 | 1.13 | 32 | 0.0018 | 3.2 | 0.01 | A | Invention Example |
| D24 | 3.3 | 0.01 | 1500 | 1.935 | 0.784 | 0.695 | 1.13 | 22 | 0.0017 | 3.3 | 0.01 | S | Invention Example |
| D25 | 3.3 | 0.01 | 2500 | 1.935 | 0.779 | 0.695 | 1.12 | 18 | 0.0019 | 3.3 | 0.01 | S | Invention Example |
| D26 | 3.3 | 0.15 | 100 | 1.933 | 0.850 | 0.706 | 1.20 | 52 | 0.0018 | 3.3 | 0.15 | C | Comparative Example |
| D27 | 3.3 | 0.15 | 400 | 1.933 | 0.799 | 0.702 | 1.14 | 41 | 0.0018 | 3.3 | 0.15 | B | Invention Example |
| D28 | 3.3 | 0.15 | 700 | 1.934 | 0.790 | 0.699 | 1.13 | 32 | 0.0017 | 3.3 | 0.15 | A | Invention Example |
| D29 | 3.3 | 0.15 | 1500 | 1.935 | 0.784 | 0.695 | 1.13 | 22 | 0.0019 | 3.3 | 0.15 | S | Invention Example |
| D30 | 3.3 | 0.15 | 2500 | 1.935 | 0.778 | 0.694 | 1.12 | 18 | 0.0018 | 3.3 | 0.15 | S | Invention Example |

Referring to Table 4, it was found that, in the grain-oriented electrical steel sheet having a amount of Si, by mass %, not in a range of 2.5% or more and 4.5% or less or a amount of Mn not in a range of 0.01% or more and 0.15% or less, the iron loss Wp deteriorated.

Example 5

A steel ingot containing, by mass %, C: 0.08%, Si: 3.3%, Mn: 0.08%, S: 0.024%, acid-soluble Al: 0.03%, and N: 0.008% with a remainder including Fe and impurities was produced. The steel ingot was heated at 1,350° C. for one hour and then hot-rolled, thereby obtaining a hot-rolled steel sheet having a sheet thickness of 2.3 mm. The obtained hot-rolled steel sheet was subjected to hot-rolled sheet annealing in which the hot-rolled steel sheet was annealed at a peak temperature of 1,100° C. for 140 seconds, pickled such that the amount of the sheet thickness decreased reached 50 μm, and then cold-rolled, thereby obtaining a cold-rolled steel sheet having a sheet thickness of 0.23 mm.

Subsequently, primary recrystallization annealing in which the temperature of the obtained cold-rolled steel sheet was rapidly increased at an average temperature increase velocity Va (° C./s) shown in Table 5A in an atmosphere containing 3 vol % of hydrogen and 97 vol % of nitrogen and having a dew point temperature of −30° C. and then decarburization annealing was carried out at 850° C. for 180 seconds in a wet hydrogen-nitrogen atmosphere was carried out. As the average temperature increase velocity Va (° C./s), the average value of temperature increase velocities from 550° C. to 700 was used, and, between rapid temperature increases for primary recrystallization annealing, a steel sheet tensile force Sa (N/mm$^2$) shown in Table 5A was imparted in the sheet travelling direction of the cold-rolled steel sheet.

Next, the annealing separating agent including MgO was applied to the surface of the cold-rolled steel sheet after primary recrystallization annealing, then, final annealing was carried out to obtain a final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out, thereby obtaining a grain-oriented electrical steel sheet having a sheet thickness of 0.15 mm or more and 0.23 mm or less. Here, the temperature Af to be reached for the flattening annealing was set to 850° C., the holding time Tf at 800° C. or higher was set to 40 seconds, and the steel sheet tensile force Cf was set to 9.8 N/mm$^2$.

For the grain-oriented electrical steel sheet obtained using the above-described method, the magnetic flux density B8 value, the iron losses Wp and Wd, the component composition of the silicon steel sheet, and the average grain size of secondary recrystallized grains were measured using the same methods as in Example 1.

In a case where the iron loss Wp was 0.800 or less, the magnetic flux density B8 value was 1.930 T or more, and Wp/Wd was 1.03 or more and 1.15 or less, the grain-oriented electrical steel sheet was determined as pass. In the case of failing to satisfy any one of these conditions, the grain-oriented electrical steel sheet was determined as fail and expressed as "C" in the evaluation column in tables. In addition, the iron losses Wp of examples determined as pass were evaluated as S (extremely favorable), A (more favorable), or B (favorable) on the basis of the same standards as in Example 1.

The manufacturing conditions, measurement results, and evaluation results of the grain-oriented electrical steel sheets are shown in Table 5A and Table 5B. For invention examples, in the component composition of the silicon steel sheet, the total amount of S and Se was 0.005% or less, the amount of acid-soluble Al was 0.01% or less, the amount of N was 0.005% or less, and the remainder was Fe and impurities.

TABLE 5A

| | Rapid temperature increase for primary recrystallization annealing | |
|---|---|---|
| Condition | Temperature increase velocity Va (° C./s) | Steel sheet tensile force Sa (N/mm$^2$) |
| E1 | 100 | 1.96 |
| E2 | 100 | 7.84 |
| E3 | 100 | 11.76 |
| E4 | 100 | 15.90 |
| E5 | 100 | 20.00 |
| E6 | 100 | 23.52 |
| E7 | 400 | 1.96 |
| E8 | 400 | 7.84 |
| E9 | 400 | 11.76 |
| E10 | 400 | 15.90 |
| E11 | 400 | 20.00 |
| E12 | 400 | 23.52 |
| E13 | 700 | 1.96 |
| E14 | 700 | 7.84 |
| E15 | 700 | 11.76 |
| E16 | 700 | 15.90 |
| E17 | 700 | 20.00 |
| E18 | 700 | 23.52 |
| E19 | 1000 | 1.96 |
| E20 | 1000 | 7.84 |
| E21 | 1000 | 11.76 |
| E22 | 1000 | 15.90 |
| E23 | 1000 | 20.00 |
| E24 | 1000 | 23.52 |
| E25 | 1500 | 1.96 |
| E26 | 1500 | 7.84 |
| E27 | 1500 | 11.76 |
| E28 | 1500 | 15.90 |
| E29 | 1500 | 20.00 |
| E30 | 1500 | 23.52 |
| E31 | 2500 | 1.96 |
| E32 | 2500 | 7.84 |
| E33 | 2500 | 11.76 |
| E34 | 2500 | 15.90 |
| E35 | 2500 | 20.00 |
| E36 | 2500 | 23.52 |

TABLE 5B

| Condition | Iron loss before magnetic domain refinement Wp (W/kg) | Iron loss after magnetic domain refinement Wd (W/kg) | Wp/Wd | Magnetic flux density BS value (T) | Silicon steel sheet Average grain size of secondary recrystallized grains (mm) | Si (%) | Mn (%) | C (%) | Evaluation | Note |
|---|---|---|---|---|---|---|---|---|---|---|
| E1 | 0.844 | 0.701 | 1.20 | 1.934 | 56 | 3.2 | 0.08 | 0.0017 | C | Comparative Example |
| E2 | 0.843 | 0.700 | 1.20 | 1.934 | 55 | 3.2 | 0.08 | 0.0019 | C | Comparative Example |
| E3 | 0.850 | 0.701 | 1.21 | 1.933 | 55 | 3.2 | 0.08 | 0.0018 | C | Comparative Example |
| E4 | 0.852 | 0.702 | 1.21 | 1.933 | 53 | 3.2 | 0.08 | 0.0018 | C | Comparative Example |
| E5 | 0.855 | 0.705 | 1.21 | 1.932 | 52 | 3.2 | 0.08 | 0.0021 | C | Comparative Example |
| E6 | 0.876 | 0.710 | 1.23 | 1.930 | 51 | 3.2 | 0.08 | 0.0021 | C | Comparative Example |
| E7 | 0.798 | 0.700 | 1.14 | 1.934 | 46 | 3.2 | 0.08 | 0.0018 | B | Invention Example |
| E8 | 0.797 | 0.701 | 1.14 | 1.934 | 44 | 3.2 | 0.08 | 0.0018 | B | Invention Example |
| E9 | 0.798 | 0.700 | 1.14 | 1.934 | 43 | 3.2 | 0.08 | 0.0018 | B | Invention Example |
| E10 | 0.799 | 0.703 | 1.14 | 1.933 | 42 | 3.2 | 0.08 | 0.0016 | B | Invention Example |
| E11 | 0.799 | 0.707 | 1.13 | 1.931 | 41 | 3.2 | 0.08 | 0.0019 | B | Invention Example |
| E12 | 0.810 | 0.711 | 1.14 | 1.929 | 35 | 3.2 | 0.08 | 0.0021 | C | Comparative Example |
| E13 | 0.788 | 0.699 | 1.13 | 1.934 | 36 | 3.2 | 0.08 | 0.0016 | S | Invention Example |
| E14 | 0.789 | 0.699 | 1.13 | 1.934 | 35 | 3.2 | 0.08 | 0.0017 | A | Invention Example |
| E15 | 0.788 | 0.700 | 1.13 | 1.934 | 33 | 3.2 | 0.08 | 0.0018 | A | Invention Example |
| E16 | 0.789 | 0.704 | 1.12 | 1.932 | 32 | 3.2 | 0.08 | 0.0019 | A | Invention Example |
| E17 | 0.808 | 0.713 | 1.13 | 1.929 | 29 | 3.2 | 0.08 | 0.0019 | C | Comparative Example |
| E18 | 0.829 | 0.726 | 1.14 | 1.924 | 25 | 3.2 | 0.08 | 0.0023 | C | Comparative Example |
| E19 | 0.783 | 0.695 | 1.13 | 1.936 | 28 | 3.2 | 0.08 | 0.0017 | S | Invention Example |
| E20 | 0.785 | 0.698 | 1.12 | 1.935 | 27 | 3.2 | 0.08 | 0.0018 | S | Invention Example |
| E21 | 0.784 | 0.695 | 1.13 | 1.936 | 26 | 3.2 | 0.08 | 0.0018 | S | Invention Example |
| E22 | 0.811 | 0.714 | 1.14 | 1.928 | 23 | 3.2 | 0.08 | 0.0017 | C | Comparative Example |
| E23 | 0.833 | 0.729 | 1.14 | 1.922 | 22 | 3.2 | 0.08 | 0.0019 | C | Comparative Example |
| E24 | 0.860 | 0.738 | 1.17 | 1.919 | 20 | 3.2 | 0.08 | 0.0023 | C | Comparative Example |
| E25 | 0.784 | 0.695 | 1.13 | 1.936 | 25 | 3.2 | 0.08 | 0.0018 | S | Invention Example |
| E26 | 0.784 | 0.695 | 1.13 | 1.936 | 25 | 3.2 | 0.08 | 0.0017 | S | Invention Example |
| E27 | 0.784 | 0.695 | 1.13 | 1.936 | 24 | 3.2 | 0.08 | 0.0018 | S | Invention Example |
| E28 | 0.814 | 0.718 | 1.13 | 1.927 | 21 | 3.2 | 0.08 | 0.0018 | C | Comparative Example |

TABLE 5B-continued

| | | | | Silicon steel sheet | | | | | | |
|---|---|---|---|---|---|---|---|---|---|---|
| Condition | Iron less before magnetic domain refinement Wp (W/kg) | Iron loss after magnetic domain refinement Wd (W/kg) | Wp/Wd | Magnetic flux density BS value (T) | Average grain size of secondary recrystallized grains (mm) | Si (%) | Mn (%) | C (%) | Evaluation | Note |
| E29 | 0.837 | 0.733 | 1.14 | 1.921 | 20 | 3.2 | 0.08 | 0.0019 | C | Comparative Example |
| E30 | 0.869 | 0.740 | 1.17 | 1.918 | 19 | 3.2 | 0.08 | 0.0025 | C | Comparative Example |
| E31 | 0.776 | 0.694 | 1.12 | 1.936 | 22 | 3.2 | 0.08 | 0.0018 | S | Invention Example |
| E32 | 0.777 | 0.694 | 1.12 | 1.936 | 22 | 3.2 | 0.08 | 0.0020 | S | Invention Example |
| E33 | 0.778 | 0.694 | 1.12 | 1.936 | 21 | 3.2 | 0.08 | 0.0023 | S | Invention Example |
| E34 | 0.818 | 0.720 | 1.14 | 1.926 | 18 | 3.2 | 0.08 | 0.0017 | C | Comparative Example |
| E35 | 0.840 | 0.735 | 1.14 | 1.920 | 17 | 3.2 | 0.08 | 0.0019 | C | Comparative Example |
| E36 | 0.876 | 0.743 | 1.18 | 1.917 | 15 | 3.2 | 0.08 | 0.0027 | C | Comparative Example |

Referring to Table 5B, it was found that, in a case where the average grain size of secondary recrystallized grains was not in a range of 10 mm or more and 50 mm or less or the magnetic flux density B8 was less than 1.930 T, the iron loss Wp deteriorated.

Example 6

A steel ingot containing, by mass %, C: 0.08%, Si: 3.3%, Mn: 0.08%, S: 0.025%, acid-soluble Al: 0.03%, and N: 0.008% with a remainder including Fe and impurities was produced. The steel ingot was heated at 1,350° C. for one hour and then hot-rolled, thereby obtaining a hot-rolled steel sheet having a sheet thickness of 2.1 mm. The obtained hot-rolled steel sheet was subjected to hot-rolled sheet annealing in which the hot-rolled steel sheet was annealed at a peak temperature of 1,100° C. for 140 seconds, pickled such that the amount of the sheet thickness decreased reached 20 µm, and then cold-rolled, thereby obtaining a cold-rolled steel sheet. In the cold rolling, the cumulative rolling reduction was controlled such that the grain-oriented electrical steel sheet obtained in the end had a sheet thickness shown in Table 6.

Subsequently, primary recrystallization annealing in which the temperature of the obtained cold-rolled steel sheet was rapidly increased in an atmosphere containing 2 vol % of hydrogen and 98 vol % of nitrogen and having a dew point temperature of −30° C. such that the average temperature increase velocity Va in 550° C. to 700° C. reached 1000° C./s and then decarburization annealing was carried out at 850° C. for 180 seconds in a wet hydrogen-nitrogen atmosphere was carried out. During the rapid temperature increase for the primary recrystallization annealing, a steel sheet tensile force Sa of 7.84 N/mm² was imparted in the sheet travelling direction of the cold-rolled steel sheet.

Next, the annealing separating agent including MgO was applied to the surface of the cold-rolled steel sheet after primary recrystallization annealing, then, final annealing was carried out to obtain a final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out, thereby obtaining a grain-oriented electrical steel sheet. Here, the temperature Af to be reached for the flattening annealing was set to 850° C., the holding time Tf at 800° C. or higher was set to 40 seconds, and the steel sheet tensile force Cf was set to 9.8 N/mm².

For the grain-oriented electrical steel sheet obtained using the above-described method, the magnetic flux density B8 value, the iron losses Wp and Wd, the component composition of the silicon steel sheet, and the average grain size of secondary recrystallized grains were measured using the same methods as in Example 1.

In a case where the iron loss Wp was 0.800 or less, the magnetic flux density B8 value was 1.930 T or more, and Wp/Wd was 1.03 or more and 1.15 or less, the grain-oriented electrical steel sheet was determined as pass. In the case of failing to satisfy any one of these conditions, the grain-oriented electrical steel sheet was determined as fail and expressed as "C" in the evaluation column in tables. The iron losses Wp of examples determined as pass were evaluated as S (extremely favorable), A (more favorable), or B (favorable) on the basis of the same standards as in Example 1.

The manufacturing conditions, measurement results, and evaluation results of the grain-oriented electrical steel sheets are shown in Table 6. For invention examples, in the component composition of the silicon steel sheet, the total amount of S and Se was 0.005% or less, the amount of acid-soluble Al was 0.01% or less, the amount of N was 0.005% or less, and the remainder was Fe and impurities.

TABLE 6

| Condition | Sheet thickness of grain-oriented electrical steel sheet (mm) | Iron loss before magnetic domain refinement Wp (W/kg) | Iron loss after magnetic domain refinement Wd (W/kg) | Wp/Wd | Magnetic flux density B8 value (T) | Average grain size of secondary recrystallized grains (mm) | Si (%) | Mn (%) | C (%) | Evaluation | Note |
|---|---|---|---|---|---|---|---|---|---|---|---|
| F1 | 0.13 | 1.174 | 1.143 | 1.03 | 1.755 | 5 | 3.2 | 0.08 | 0.0014 | C | Comparative Example |
| F2 | 0.15 | 0.692 | 0.602 | 1.15 | 1.930 | 48 | 3.2 | 0.08 | 0.0014 | S | Invention Example |
| F3 | 0.18 | 0.719 | 0.628 | 1.14 | 1.930 | 42 | 3.2 | 0.08 | 0.0015 | S | Invention Example |
| F4 | 0.20 | 0.755 | 0.660 | 1.14 | 1.931 | 34 | 3.2 | 0.08 | 0.0017 | S | Invention Example |
| F5 | 0.23 | 0.785 | 0.699 | 1.12 | 1.934 | 27 | 3.3 | 0.08 | 0.0018 | S | Invention Example |
| F6 | 0.27 | 0.826 | 0.738 | 1.12 | 1.935 | 23 | 3.3 | 0.08 | 0.0025 | C | Comparative Example |

When the results of Table 6 are referred to, it was found that the grain-oriented electrical steel sheets having a sheet thickness of 0.15 mm or more and 0.23 mm or less were determined as B or higher (favorable or higher).

Hitherto, the preferred embodiments of the present invention have been described in detail with reference to the accompanying drawings, but the present invention is not limited to such examples. It is evident that a person skilled in the art is able to consider a variety of modification examples or correction examples within the scope of the technical concept described in claims, and it is needless to say that these examples are also understood to belong to the technical concept of the present invention.

INDUSTRIAL APPLICABILITY

According to an aspect of the present invention, it is possible to manufacture a grain-oriented electrical steel sheet having a lower iron loss. Specifically, according to an aspect of the present invention, after the primary recrystallization annealing, crystal grains in a Goss orientation having favorable magnetic characteristics increase, and thus it is possible to manufacture a grain-oriented electrical steel sheet in which the diameters of crystal grains are decreased while improving the integration degree of crystal grains after secondary recrystallization in the Goss orientation. Therefore, it is possible to manufacture a grain-oriented electrical steel sheet having a further decreased iron loss value. In addition, according to another aspect of the present invention, it is possible to provide a grain-oriented electrical steel sheet having a decreased iron loss even when a magnetic domain refinement treatment is not carried out.

The invention claimed is:
1. A grain-oriented electrical steel sheet, comprising:
a silicon steel sheet;
a forsterite coating disposed on the silicon steel sheet; and
an insulating film disposed on the forsterite coating,
wherein the silicon steel sheet has a component composition containing, by mass %,

Si: 2.5% or more and 4.5% or less,
Mn: 0.01% or more and 0.15% or less,
C: 0% or more and 0.0050% or less,
S and Se in total: 0% or more and 0.005% or less,
acid-soluble Al: 0% or more and 0.01% or less,
N: 0% or more and 0.005% or less
Cu: 0% or more and 0.30% or less,
Sn: 0% or more and 0.30% or less,
Ni: 0% or more and 0.30% or less,
Cr: 0% or more and 0.30% or less, and
Sb: 0% or more and 0.30% or less,
with a remainder including Fe and impurities,
an average grain size of secondary recrystallized grains in the silicon steel sheet is 10 mm or more and 50 mm or less, and
the grain-oriented electrical steel sheet has
a sheet thickness of 0.15 mm or more and 0.23 mm or less,
an iron loss Wp of 0.790 W/kg or less in terms of $W_{17/50}$,
Wp/Wd of 1.03 or more and 1.15 or less in term of $W_{17/50}$, the Wp/Wd being a ratio of the iron loss Wp to an iron loss Wd in the case of being magnetic domain-refined, and
a magnetic flux density B8 value of 1.930 T or more.

2. The grain-oriented electrical steel sheet according to claim 1,
wherein the component composition of the silicon steel sheet contains, by mass %, one or more of
Cu: 0.01% or more and 0.30% or less,
Sn: 0.01% or more and 0.30% or less,
Ni: 0.01% or more and 0.30% or less,
Cr: 0.01% or more and 0.30% or less, and
Sb: 0.01% or more and 0.30% or less.

* * * * *